(12) United States Patent
Duggal et al.

(10) Patent No.: US 11,030,281 B2
(45) Date of Patent: *Jun. 8, 2021

(54) SYSTEMS AND METHODS FOR DOMAIN-DRIVEN DESIGN AND EXECUTION OF MODULAR AND DYNAMIC SERVICES, APPLICATIONS AND PROCESSES

(71) Applicant: EnterpriseWeb LLC, Glens Falls, NY (US)

(72) Inventors: Dave M. Duggal, Glens Falls, NY (US); William J. Malyk, Guelph (CA)

(73) Assignee: EnterpriseWeb LLC, Glens Falls, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/525,344

(22) Filed: Jul. 29, 2019

(65) Prior Publication Data
US 2020/0125698 A1  Apr. 23, 2020

Related U.S. Application Data

(63) Continuation of application No. 15/589,864, filed on May 8, 2017, now Pat. No. 10,387,631.
(Continued)

(51) Int. Cl.
*G06F 9/44*   (2018.01)
*G06F 21/12*  (2013.01)
(Continued)

(52) U.S. Cl.
CPC ........ *G06F 21/126* (2013.01); *G06F 16/2457* (2019.01); *G06F 16/289* (2019.01);
(Continued)

(58) Field of Classification Search
CPC ... G06F 8/24; G06F 8/70; G06F 16/00; G06F 16/2457; G06F 16/289; G06F 21/126;
(Continued)

(56) References Cited

U.S. PATENT DOCUMENTS 6,789,252 B1   9/2004   Burke
7,383,534 B1   6/2008   Agbabian
(Continued)

OTHER PUBLICATIONS

Victor Savkin, "Data Context Interaction: The Evolution of the Object Oriented Paradigm", Aug. 2012, retrieved from https://www.sitepoint.com/, 7 pages. (Year: 2012).*
(Continued)

*Primary Examiner* — Ted T. Vo
(74) *Attorney, Agent, or Firm* — Ahmann Kloke LLP

(57) ABSTRACT

A context of one or more interactions is determined. Base objects are transformed into interpreted objects by interpreting the base objects based on evaluation of the context, and by resolving references of the base objects relative to domain model types and concepts, each of the base objects modeled using a same declarative modeling language, the same declarative modeling language enabling transitions between the interpreted objects, at least one of the interpreted objects including at least one post-condition providing hooks for transition policies which allow the at least one of the interpreted objects to be logically chained in a non-linear process. Transitioning between at least two of the interpreted objects by chaining the at least two interpreted objects based on a particular post-condition of a particular interpreted object to create at least a portion of a particular non-linear process. At least a portion of the particular non-linear process is executed.

20 Claims, 16 Drawing Sheets

Related U.S. Application Data

(60) Provisional application No. 62/332,898, filed on May 6, 2016.

(51) Int. Cl.

| | | |
|---|---|---|
| *G06F 16/2457* | (2019.01) | |
| *G06F 16/28* | (2019.01) | |
| *H04L 29/08* | (2006.01) | |
| *H04W 4/00* | (2018.01) | |
| *G06F 21/33* | (2013.01) | |
| *H04L 29/06* | (2006.01) | |
| G06F 16/00 | (2019.01) | |
| G06F 21/54 | (2013.01) | |
| G06F 21/60 | (2013.01) | |
| G06F 8/20 | (2018.01) | |
| G06F 8/70 | (2018.01) | |
| H04W 12/04 | (2021.01) | |
| H04W 12/08 | (2021.01) | |

(52) U.S. Cl.
CPC ........ *G06F 21/335* (2013.01); *H04L 63/0263* (2013.01); *H04L 67/00* (2013.01); *H04W 4/00* (2013.01); *G06F 8/24* (2013.01); *G06F 8/70* (2013.01); *G06F 16/00* (2019.01); *G06F 21/54* (2013.01); *G06F 21/604* (2013.01); *H04L 63/20* (2013.01); *H04W 12/04* (2013.01); *H04W 12/08* (2013.01)

(58) Field of Classification Search
CPC ...... G06F 21/335; G06F 21/54; G06F 21/604; H04L 63/0263; H04L 63/20; H04L 67/00; H04W 4/00; H04W 12/04; H04W 12/08
USPC .................. 717/101–108, 114–117, 120–123
See application file for complete search history.

(56) References Cited

U.S. PATENT DOCUMENTS

| | | | |
|---|---|---|---|
| 7,627,861 | B2 | 12/2009 | Smith |
| 8,060,864 | B1 | 11/2011 | Michelsen |
| 8,621,598 | B2 | 12/2013 | Lai |
| 9,143,385 | B2 | 9/2015 | Bishop |
| 9,292,262 | B2 | 3/2016 | Gabel |
| 9,558,322 | B2 | 1/2017 | Carey |
| 9,841,955 | B2 | 12/2017 | Duggal |
| 10,387,631 | B2 * | 8/2019 | Duggal ................... H04W 4/00 |
| 10,432,464 | B2 | 10/2019 | Franke |
| 2010/0199260 | A1 | 8/2010 | Duggal |
| 2013/0246996 | A1 | 9/2013 | Duggal |
| 2014/0006220 | A1 | 1/2014 | Thiele |
| 2014/0013301 | A1 | 1/2014 | Duggal |
| 2015/0149640 | A1 | 5/2015 | Douglas |
| 2015/0309772 | A1 | 10/2015 | Duggal |
| 2016/0062763 | A1 | 3/2016 | Duggal |
| 2017/0003950 | A1 | 1/2017 | Newell |
| 2017/0012898 | A1 | 1/2017 | Zhu |
| 2017/0212733 | A1 | 7/2017 | Duggal |
| 2018/0191581 | A1 | 7/2018 | Yu |
| 2019/0052549 | A1 * | 2/2019 | Duggal .............. G06Q 30/0635 |

OTHER PUBLICATIONS

Dejan Mitrovic, "Intelligent Multiagent Systems based on Distributed Non-Axiomatic Reasoning", 2015, Thesis from University of Novi Sad, Serbia, 179 pages. (Year: 2015).*
Aruba Networks, "Aruba Networks Government Solutions Guide", Apr. 2014, 55 pages (Year: 2014).*
Andreessen, Marc, "Why Software is Eating the World," The Wall Street Journal, Aug. 20, 2011 [retrieved online at http://www.aberdeeninvestment.com/wp-content/uploads/2009/11/Why-Software-Is-Eating-The-World-8-20-111.pdf on Aug. 2, 2017].
Autili, Marco et al., "Service Lifecycle Management," European Commission, Information Society and Media, Apr. 20, 2008.
Foote, Brian et al., "Big Ball of Mud," Jun. 26, 1999 [retrieved online at http://www.laputan.org/pub/foote/mud.pdf on Aug. 2, 2017].
Mayer, Andrew et al., "The Third Network: Lifecycle Service Orchestration Vision," The Metro Ethernet Forum, Feb. 2015.
Rotsos, Charalampos et al., "Network Service Orchestration Standardization: A Technology Survey," Computer Standards & Interfaces, vol. 54, No. 4, pp. 203-215, Nov. 2017.
Van De Sompel, Herbert, et al., "Reminiscing About 15 Years of Interoperability Efforts," D-Lib Magazine, vol. 21, No. 11/12, Nov. 2015.
International Application No. PCT/US2017/031622, International Search Report and Written Opinion dated Jul. 19, 2017.
U.S. Appl. No. 61/149,179, filed Feb. 2, 2009.
U.S. Appl. No. 61/612,907, filed Mar. 19, 2012.
U.S. Appl. No. 62/287,201, filed Jan. 26, 2016.

* cited by examiner

SYSTEMS AND METHODS FOR DOMAIN-DRIVEN DESIGN AND EXECUTION OF MODULAR AND DYNAMIC SERVICES, APPLICATIONS AND PROCESSES

CROSS-REFERENCE TO RELATED APPLICATIONS

This application is a continuation of U.S. Nonprovisional patent application Ser. No. 15/589,864, filed May 8, 2017, entitled "Systems and Methods for Domain-Driven Design and Execution of Modular Dynamic Services, Applications and Processes," now U.S. Pat. No. 10,387,631, which claims the benefit of U.S. Provisional Patent Application Ser. No. 62/332,898, filed May 6, 2016 and entitled "Model-Based Application Development," which are incorporated herein by reference. The present application is related to U.S. Nonprovisional patent application Ser. No. 15/417,122, filed Jan. 26, 2017 and entitled "Unified Operating System for Distributed Computing," which claims the benefit of U.S. Provisional Patent Application Ser. No. 62/287,201, filed Jan. 26, 2016 and entitled "Unified Operating System for Distributed Computing," both of which are incorporated herein by reference.

Aspects of the current disclosure are related to U.S. Nonprovisional patent application Ser. No. 14/936,020, filed Nov. 9, 2015, which is a continuation of U.S. Nonprovisional patent application Ser. No. 14/022,033, filed Sep. 9, 2013, now U.S. Pat. No. 9,182,977 issued Nov. 10, 2015, which is a continuation of U.S. Nonprovisional patent application Ser. No. 12/698,361, filed 2 Feb. 2, 2010, now U.S. Pat. No. 8,533,675 issued Sep. 10, 2013, which claims the benefit of U.S. Provisional Patent Application Ser. No. 61/149,179, filed Feb. 2, 2009, each of which is incorporated herein by reference.

TECHNICAL FIELD

The disclosure relates generally to a dynamic language for declaratively modeling objects using domain concepts, types and policies, and the systems and methods of interpreting that language to process the objects (e.g. configure, control, implement) and realizing them as contextually motivated services.

DESCRIPTION OF RELATED ART

The work of organizations is typically implemented in formal and informal processes that organize the use of its resources (e.g., people, information, capabilities, infrastructure, assets, or the like) to deliver value. These processes may lead to a series of discrete tasks that must be executed by individuals or systems (note: "systems" is used here in the general form, not a specific technology and not even necessarily a technology). However, given interdependencies between tasks, individuals or systems working in isolation are prone to return suboptimal outputs if they may not efficiently coordinate with other people and other systems to share relevant resources and communicate relevant changes on a timely basis.

Task outputs may not be responsive to relevant external events if their operations are statically defined in advance, which materially constrains the exploitation of contextually relevant resources or limits context to pre-defined parameterization. Likewise, the overall process may not be responsive to relevant external events if it is connected in a rigid flow pattern which materially constrains the exploitation of contextually relevant resources or limits context to pre-defined parameterization, limiting the responsiveness of the process. In effect, such siloed process tasks and flows are optimized for a fixed pre-established context, which is inherently procedural and unable to naturally leverage contextually relevant resources from the broader domain.

Malone's "Coordination Theory," which is a general academic theory, studied interdependencies between process tasks and their management to explore more flexible and responsive patterns of interaction. In Computer Science, Coordination is studied in multiple areas including Autonomics, Multi-Agent Systems, Transition Systems, etc. and is associated with Actor Theory, Blackboards, Choreography, Dataflow, etc. The most prominent academic byproduct of this research was Linda and Linda-like systems, which implement some of these concepts. However, this class of software never achieved mainstream status as commercial products.

The software industry remains generally bound to static, linear processes and orchestration, which is typically based on the Business Process Execution Language, BPEL, an Object Management Group (i.e., OMG) standard or conceptually related domain-specific approaches (e.g., OpenStack HEAT), which were adopted by the vendor community over alternative proposals, such as the Choreography Description Language (i.e., CDL), which were subsequently abandoned. BPEL is often expressed using Business Process Modeling Notation (BPMN) and complimented with other OMG standards, Decision Modeling Notation (DMN), Case Management Modeling Notation (CMMN), and the emerging Value Domain Modeling Language (VDML), which are all implemented as separate software components intended to add capabilities. However, they each represent discrete modeling notations with specific software implementations and versions, that are related, but differences in modeling semantics and implementations lead to incomplete and imperfect mappings between the components, which constrain expressivity. In addition, the component-based approach also suggests multiple libraries and run-time engines to process the models leading to a manually-integrated and tightly-coupled middleware component stack, which is collectively hard to change and brittle; as secure, performant, scalable and resilient as the least secure, performant, scalable and resilient component.

In real-world deployments, these stacks are often extended by one or more rules engines, databases, enterprise service buses, complex event processors, etc. Additional components compound the accidental complexity, further constraining the overall solution architecture, and further limiting its support for the type of flexible and responsive interactions patterns suggested by Coordination Theory.

The primary alternative to BPEL-based or the like process modeling is custom software development using advanced languages and frameworks such as Erlang and Spring. While these languages support highly-dynamic and distributed processes, each one is itself a hard-coded development effort and all of the interdependencies are coded in advance, which does not have the same conceptual potential of models for flexibility, extensibility and adaptability.

In 1999 an academic paper titled "The Big Ball of Mud" exposed fundamental limitations of "modern" software development practices. Such papers reflect the tension between theory and applied science.

While "software is eating the world," software headaches (See https://www.wsj.com/articles/SB10001424053111903480904576512250915629460) are compounding as old practices may not support today's new requirements; they appear ill-suited for our increasingly dynamic, diverse and distributed age.

Value-chains are becoming increasingly complex orchestrations across multiple silos, partners, technologies and standards. As a result, a software application is no longer a single thing, but rather a composite built from internal, third party and public elements (e.g., Web-services, REST APIs, Microservices, atomic functions, systems, databases, devices), which are natively loosely-coupled. Application behavior is now dependent on the sum of interactions between participating elements. Manually-integrating these elements into services, applications and processes creates tightly-coupled, static and brittle solutions, which are in-turn dependent on tightly-coupled, static and brittle middleware component stacks. "The Big Ball of Mud" is growing exponentially in a tangle of connections that now spans beyond organizational boundaries.

As organizations hurdle towards becoming digital businesses, they expect more of their software; pushing boundaries and exposing weaknesses. The limitation of conventional modeling tools and software development practices is becoming more widely perceived as they are holding back the next wave of productivity and connectedness. The challenge is to connect elements for meaningful behavior without resorting to static, non-responsive and brittle methods.

Without efficient, timely coordination, distributed organizations risk becoming increasingly fragmented.

SUMMARY

A claimed solution rooted in computer technology overcomes problems specifically arising in the realm of computer technology. In various embodiments, a context of one or more interactions is determined. Two or more base objects are transformed into two or more interpreted objects by interpreting the two or more base objects based on evaluation of the context, and by resolving references of the two or more base objects relative to domain model types and concepts, each of the two or more base objects modeled using a same declarative modeling language, the same declarative modeling language enabling transitions between the two or more interpreted objects, at least one of the two or more interpreted objects including at least one post-condition, the at least one post-condition providing hooks for transition policies which allow the at least one of the two or more interpreted objects to be logically chained in a non-linear process. Transitioning between at least two of the two or more interpreted objects by chaining the at least two of the two or more interpreted objects based on a particular post-condition of a particular interpreted object of the at least two of the two or more interpreted objects to create at least a portion of a particular non-linear process. At least a portion of the particular non-linear process is executed.

In some embodiments, the one or more interactions include a real-time system request.

In some embodiments, the post-conditions provide hooks for one or more of the two or more interpreted objects to subscribe to interactions associated with a particular interpreted object.

In some embodiments, the at least two of the two or more interpreted objects are chained based on conditional policy-based interactions in a Publish-Subscribe style pattern.

In some embodiments, the at least two of the two or more interpreted objects are chained based on conditional policy-based links in a Hypermedia As The Engine Of Application State style pattern.

In some embodiments, the at least one pre-condition and the at least one post-condition are inherited from software contracts of the base objects. In related embodiments, the software contracts specify non-functional concerns, wrapping at least one of the two or more interpreted objects with centralized policies, thereby enabling common management of heterogeneous objects. In related embodiments, the centralized policies include security controls, the security controls comprising any of role-based access controls, license keys, certifications and authorizations. In related embodiments, the centralized policies include system controls, the system controls comprising state management controls.

In some embodiments, the at least one of the two or more interpreted objects include at least one pre-condition.

In some embodiments, the at least one pre-condition provides hooks for permissions which support configuration and enforcement of security and identity policies.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the technology are utilized, and the accompanying drawings of which:

DETAILED DESCRIPTION

Figure 1:
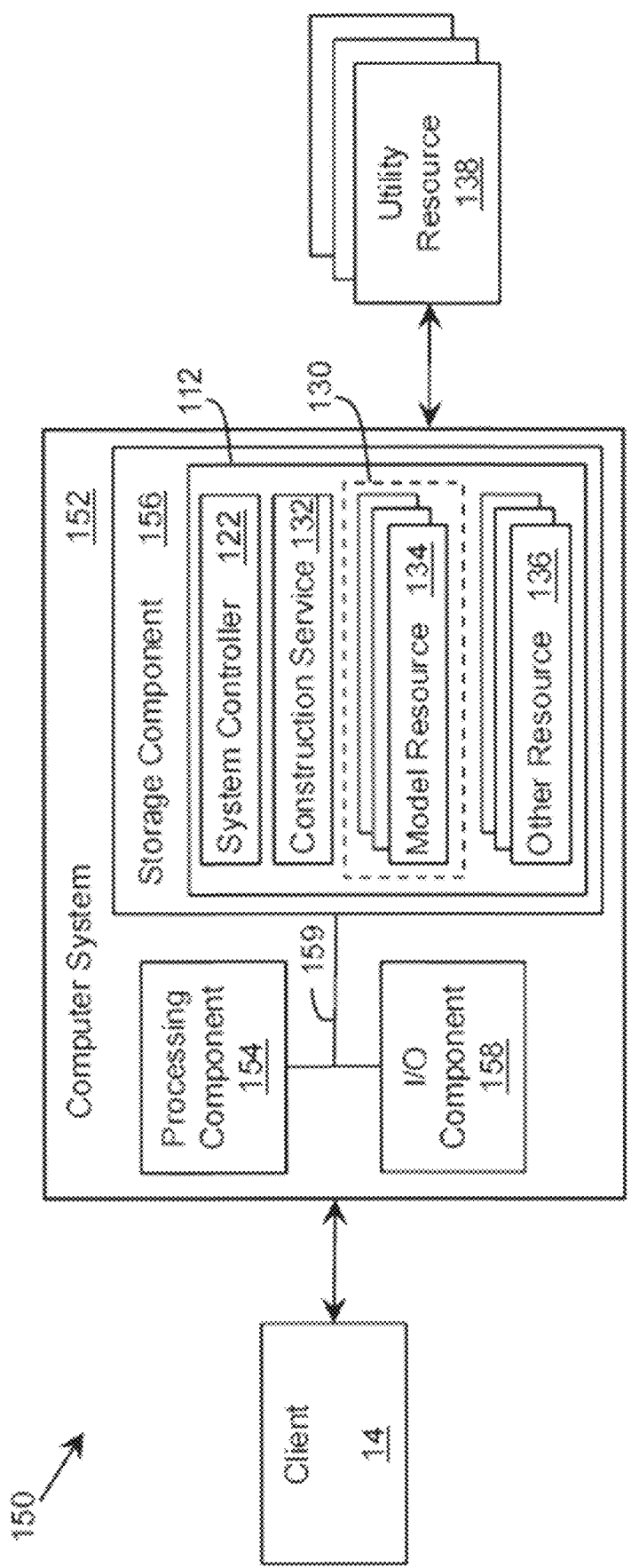
FIG. 1 depicts a diagram of an example of a system for interpreting, configuring and controlling objects (e.g., graph objects) according to some embodiments.

In various embodiments, a computing system platform (or, simply, "system" or "platform") enables declarative modeling of complex distributed domains and the use of domain metadata and/or metrics to configure and/or control dynamic dataflow processes and/or real-time state to optimize dynamic dataflow processes. The domain model may provide shared concepts and types that represent an extensible set of semantically-related building blocks that may be shared across processes for integrated operations. In one example, the domain model performs like an application fabric or metadata backplane that may allow tasks to coordinate across business silos, layers of Information Technology, administrative domains, organizational boundaries and industry standards. The domain model may also connect across deployment models (e.g., server, virtual machine or container-based processes) and devices and machines (e.g., Internet-of-Things).

Dynamic languages are, by definition, interpreted, rather than compiled languages, which allows for run-time evaluation of conditions, though the scope may vary by language. Some embodiments described herein, raise scope to an arbitrarily defined domain of shared concepts and types, with a common object data store for persistence. At least some of the systems and methods describe herein provide highly-efficient processing of live metadata and state, which allows for highly-dynamic domain-driven, compute and I/O intensive applications, which supports the real-time interpretation of complex objects. The context of interactions may be interpreted in real-time. Context may include the current state of one or more elements, whether they are reflecting on state of solution elements (direct through interfaces or indirect through monitoring tools or probes) during processing or "looking-up" state of one or more referenced system objects. Context may also include querying past state of one or more system objects for comparison, change history, audit or analytical purposes, etc. Further, context may include the sum of correlating the state of two or more elements or objects.

In some embodiments, the platform provides a single notation and/or run-time for declaratively modeling complex ontologies, objects, services/apps, processes, policies and communications. This may provide a unified toolchain for architects, solution developers and technical staff. This may, for example, ensure, within the domain, nothing is lost in translation—"What you model is what you get." In this example, from a Functional Programming perspective, the platform is side-effect free.

In some embodiments, fully declarative modeling and fully dynamic execution means the platform separates models from implementations, which allows business logic to be represented by "intent-based" interfaces without having to consider underlying technical complexity or hard-coding their choices, rather they rely on the execution environment to implement behavior. Models may include reflective policies, which may prompt an evaluation of run-time state for a modern implementation of complex events and autonomic processes.

Loose-coupling of declaratively modeled objects may ensure all processes are goal-oriented, event-based, domain-driven and policy-controlled for rich enterprise-class processes based on an asynchronous interaction pattern, which may be highly-scalable, available and resilient.

In various embodiments, a system agent handles interactions (e.g., human and/or system requests, as well as schedule, timed and ad-hoc events), using in-band metadata to translate policies back to specific domain concepts and types, which align business semantics to implementations. In some embodiments, the agent functions as a mediator, which may be implemented as a Representational State Transfer (REST) Intermediary, to render a late-binding service, and to enable pervasive loose-coupling of all system objects and universal separation of concerns.

The agent may decouple models from implementations, thereby enabling declarative modeling of highly-connected and dynamic dataflow processes. The agent may decouple consumers and providers for interoperability and evolution (e.g., connected solution elements, actors, applications and interface standards may evolve independent of each other for non-disruptive forward migration). The agent may decouple state from process by providing a backing service for persistence.

FIG. 1 depicts a diagram of an example of a system 100 for interpreting, configuring and controlling objects (e.g., interpreted objects) according to some embodiments. In the example of FIG. 1, the model resources 134 represent an application, which is executing in an environment in order to perform an activity according to an embodiment. To this extent, the environment 150 includes a computer system 152 that may perform a process described herein in order to manage the model resources 134 representing the application and other resources 136.

The computer system 152 is shown including a processing component 154 (e.g., one or more processors), a storage component 156 (e.g., a storage hierarchy), an input/output (I/O) component 158 (e.g., one or more I/O interfaces and/or devices), and a communications pathway 159. In general, the processing component 154 executes program code, such as a system controller 122 of the modeling application and/or representations of one or more resources of the application, which is at least partially fixed in the storage component 156. The storage component 156 may include at least one non-transitive computer readable medium (e.g., hard drive, optical disk, flash memory, and/or the like).

While executing program code, the processing component 154 may process data, which may result in reading and/or writing transformed data from/to the storage component 156 and/or the I/O component 158. The pathway 159 provides a communications link between each of the components in the computer system 152. The I/O component 158 may comprise one or more human I/O devices, which enable a human client 14 to interact with the computer system 152 and/or one or more communications devices to enable a system client 14 to communicate with the computer system 152 using any type of communications link. To this extent, the computer system 152 may manage a set of interfaces (e.g., graphical user interface(s), application program interface, and/or the like) that enable human and/or system clients 14 to interact with the application via the modeling application. Furthermore, the modeling application may manage (e.g., store, retrieve, create, manipulate, organize, present, or the like) data, such as one or more of the model resources of the application or other resources 136, using any data management solution.

The computer system 152 may be any digital device and may include any number of digital devices. A digital device is any device with at least one processor and memory.

The computer system 152 may comprise one or more general purpose computing articles of manufacture (e.g., computing devices) capable of executing program code, such as the system controller 122 of the modeling application, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, the modeling application may be embodied as any combination of system software and/or application software.

As used herein, the term "component" means any configuration of hardware, with or without software, which implements the functionality described in conjunction therewith using any solution. The term "module" means program code that enables a computer system 152 to implement the functionality described in conjunction therewith using any solution, and refers to the system controller 122 and program artifacts of the resources of the application. When fixed in a storage component 156 of a computer system 152 that includes a processing component 154, a module is a substantial portion of a component that implements the functionality. Regardless, it is understood that two or more components, modules, and/or systems may share some/all of their respective hardware and/or software. Furthermore, it is understood that some of the functionality discussed herein may not be implemented or additional functionality may be included as part of the computer system 152.

When the computer system 152 comprises multiple computing devices, each computing device may have only a portion of the modeling application and/or the application fixed thereon (e.g., one or more resources of the application). However, it is understood that the computer system 152 and the modeling application are only representative of various possible equivalent computer systems that may perform a process described herein. To this extent, in other embodiments, the functionality provided by the computer system 152 and the modeling application may be at least partially implemented by one or more computing devices that include any combination of general and/or specific purpose hardware with or without program code. In each embodiment, the hardware and program code, if included, may be created using standard engineering and programming techniques, respectively.

Regardless, when the computer system 152 includes multiple computing devices, the computing devices may communicate over any type of communications link. Furthermore, while performing a process described herein, the computer system 152 may communicate with one or more other computer systems using any type of communications link. In either case, the communications link may comprise any combination of various types of wired and/or wireless links, comprise any combination of one or more types of networks, and/or utilize any combination of various types of transmission techniques and protocols. In an embodiment, the computer system 152 comprises an application server, which communicates with clients 14 over the Internet.

As discussed herein, the application may be represented by model resources 134. Additionally, the computer system 152 (e.g., by executing the modeling application) may provide dynamic design, use, and modification of the model resources 134 representing the application using a declarative application meta-model that provides for self-modification. To this extent, the computer system 152 may enable continuous real-time testing, simulation, deployment, and modification of the model resources 134 representing the application as described herein.

Execution of the application may result in the generation of one or more other resources 136. The other resources 136 may be utilized along with the model resources 134, to enable the computer system 152 to execute a set of actions used by the application to perform an activity. One or more of the resources of the application may be separately developed and/or implemented remote from other portions of the application. For example, a set of utility resources 138 are shown implemented remote from the application. However, it is understood that any resources of the application, such as one or more of the model resources 134, also may be separately developed and/or implemented. Furthermore, it is understood that the environment may include a mix of model resources 134 that are part of the application 130 and remote from the application.

As described herein, a model resource 134 may represent an entity, a function, and/or the like. The model resources 134 may include one or more sets of related models, each of which may represent a complex entity, a complex function, and/or the like. A set of related models may be expressed using a set of declarative relations, which may be defined using any solution, and stored as model resources 134 of the application using any solution. For example, a declarative relation may be defined using a uniform resource identifier (URI), a metadata reference, and/or the like.

In an embodiment, the environment 150 is a modeling environment providing dynamic design, use, and modification of the model resources 134 of the application using a declarative application meta-model that provides for self-modification and the client 14 is a user using the application executing in the modeling environment to perform continuous real-time testing, simulation, deployment, and/or modification of the model resources 134 of the application. In this case, the activities that the user may perform using the application may include dynamically modifying one or more aspects of the software application in the runtime environment.

A software application, by being processed by an intermediary component, may manage an application layer, which enables a user 14 to use the software application to perform one or more activities, each of which is defined using a set of model resources 134 of the software application.

As used herein, it is understood that the term "activity" may mean a set of atomic operations to accomplish a goal (e.g., form a complete business/technical process). The goal may be set when the activity is initiated (e.g., when a request, such as an HTTP request, is received from a user 14), but the specific atomic operation(s) performed by executing the application to accomplish the goal may vary based on the context information corresponding to each instance of an activity to which the software application is directed. A group of related atomic operations (e.g., a compound operation) is referred to herein as a "task" (e.g., a process fragment). A task is a discrete fragment of an activity that fulfills a defined objective in furtherance of the goal (e.g., complete a form, review a form, submit a form, modify a form, and/or the like). Similar to an activity, the objective of the task is set when the activity is initiated, but the specific atomic operation(s) performed by executing the application to accomplish the goal may vary based on the context information corresponding to the activity. It is understood that some atomic operations and/or tasks may be performed as standalone operations (e.g., report generation, basic navigation), apart from a larger task or activity. In this case, the atomic operation is a task and activity in itself or the task is an activity in itself.

An "end user activity" is a type of activity performed by the user 14 using the application in its intended manner to accomplish a goal. For example, if the application manages an end user interface that provides a word processor user interface, the end user activities include those activities performed by the user 14 that utilize the word processor to create a document. Furthermore, the end user activities may include those activities performed by the user 14 that customize one or more attributes of the word processor user interface according to the preferences of the user 14 (e.g., by modifying a setting exposed to the user 14 or by default attributes for the document), including a "plug-in" component to provide expanded functionality, and/or the like. In an embodiment, end user activities of the application include one or more development activities.

A "development activity" is an activity performed by the user 14 using the application, which changes one or more attributes of a set of changeable resources of the application. The changeable resources may include model resources 134 that define at least a portion of an application model, which is applied by the application to perform one or more activities. To this extent, a development activity may comprise an activity historically performed by a programmer, a designer, and/or the like, in a software development environment. However, a development interface managed by the application may enable a user 14 to perform the development activity in the environment. The development interface may manage any combination of various types of development tools for use by the user 14, such as a modeling environment (e.g., a declarative modeling environment), an integrated development environment, and/or the like. In this manner, the environment may provide dynamic design, use, and modification of the application represented by a collection of models (as embodied in the model resources 134) using a declarative application meta-model that provides for self-modification, and may enable continuous real-time testing, simulation, deployment, and modification of the application represented by the collection of models. In an embodiment, the changeable resources of the application are immutable (static). In this case, a change to a changeable resource results in a new version of the changeable resource being created, which is linked in place of the previous version. The use of immutable resources may provide an ability for the application to provide an auditable history of changes, rollback a change, and/or the like.

Resources of the application (or representations thereof) may be processed by an intermediary component. The resources may include a set of changeable resources and a set of static resources. A changeable resource in the set of changeable resources may comprise a resource that is capable of being dynamically modified by the user 14. In an embodiment, a change to a changeable resource, such as a model resource 134, does not require any compilation to take effect in the application.

A static resource in the set of static resources may comprise a resource that is not capable of being dynamically modified by the user 14. In an embodiment, the set of changeable resources includes a first subset of the model resources 134 and static resources includes a second subset of the model resources 134. It will be appreciated that this is only illustrative, and an embodiment of the environment may include no static resources, no changeable resources, and/or the like. Furthermore, while the construction service resource 132 and the system controller 122 may be resources, these resources 132, 122 may not be changeable by the user 14.

When the set of changeable resources may include one or more model resources 134 and/or relation information (e.g., declarative relations) for a set of related models, the user 14 may modify a configuration of the software application while an instance of the software application is executing by modifying a configuration of one or more of the model resources 134 and/or relation information. Such a modification may result in an immediate modification to the configuration of the software application (e.g., when the model resources 134 and/or relation information are stored as non-compiled information). Additionally, the modification may have any applicable scope. For example, the modification may modify a configuration of an instance of the modified changeable resource(s) for the user 14, a configuration of the modified changeable resource(s) for use in subsequent instances and/or of the changeable resource(s), and/or the like. In this manner, the software application may support local variance, global change, and/or the like, and may enable continuous real-time testing, simulation, deployment, and modification of the models and set(s) of related models representing the software application.

Each resource representing the software application (e.g., each model resource 134) may have a set of properties. To this extent, when the resource is a changeable resource, one or more properties of the changeable resource may be modified by the user 14 while the software application is executing. Furthermore, when a model resource 134 is included in a set of related models, each model in the set of related models may be capable of configuring one or more of a set of properties of the set of related models. In this case, collective properties of the set of related models (e.g., a complex entity, a complex function, and/or the like) may emerge dynamically from interaction of the set of related models (e.g., in real-time during execution of the software application). In this manner, the software application may have a set of dynamically emergent properties, which are inherited from the collective properties of the interaction of the set(s) of related models representing the software application.

An ability of a user 14 to modify one or more resources of the software application may be provided by a set of models of modification controls, which are included in the model resources 134 of the software application. To this extent, the user 14 may be restricted from modifying a static resource in the set of static resources and/or allowed be make modifications to a changeable resource in the set of changeable resources based on the set of models of modification controls. The set of models of modification controls may enable the user 14 to make modifications of any scope (e.g., local variance, global change, and/or the like) to a changeable resource. It is understood that the set of models of modification controls may enable/disable an ability to modify one or more resources differently for multiple users. To this extent, whether a resource of the software application is a changeable resource or a static resource may depend on the user 14. Furthermore, the set of models of modification controls may be resources (e.g., model resources 134) of the software application, and themselves may be changeable resources for one or more users 14 of the software application. In this case, any restrictions on an ability of a user 14 to modify a resource is not an inherent limitation of the software application, but rather is a purposeful limitation based on the goals of the software application, which may be modified.

An intermediary component may be configured to process each interaction request made by the user 14 as part of an activity (development or end user). In a more particular embodiment, the intermediary component is a generic component, which may be used to execute multiple applications configured to perform activities of any type. The model resources 134 of the software application may define the logic of how the software application performs each activity. To this extent, the intermediary component may operate in a context-independent manner without including or relying on any run-time logic or data specific to the particular application (e.g., the activities performed using the application) on which the intermediary component is operating. In this case, such logic and/or data of the application are defined within the set of changeable resources and/or a set of static resources.

In a more particular illustrative embodiment, the intermediary component comprises the system controller 122 and the construction service 132. In this case, the system controller 122 may receive each request generated by a user 14 and perform pre-processing of the request. As part of processing the request, the system controller 122 may instantiate a container for processing the request, and request a representation of the construction service resource 132 for execution in the container. The construction service resource 132 may further process the request within the container. To this extent, for every atomic operation performed by the application, an instance or representation of the same system controller 122 and construction service resource 132 may be used to process the request. The processing of each atomic operation by the construction service resource 132 may include obtaining an instance of a resource identified in the request, such as a changeable resource or a static resource, and processing the logic included in the instance of the resource.

By obtaining, in response to receiving a request, an instance of a resource identified in the request, and instances of any other resources required to complete the request, the intermediary component binds the resource(s) of the application in real-time to dynamically construct an implementation of the resource. The intermediary component may bind the resource in real-time for every interaction with the resource (e.g., each request requiring the resource). To this extent, any model resource(s) required to complete the request bind in real-time when processing the request. When the application includes a set of models of modification controls, these models also may bind in real-time. As a result, the application may support customization, personalization, machine-learning (e.g., automated change management), and/or the like.

The application logic may be defined by the application resources (e.g., assets such as models, code, data, policies, and/or the like). In an embodiment, each of the application resources is stateless. That is, each execution of an application resource may be performed using resources obtained during the execution. The execution may be in the form of processing representations of the resources, consistent with REST constraints (e.g., stateless 'read' of the system resources) and any state changes may be managed by creating new resource(s) consistent with the principles of immutability (e.g., a stateless 'write' of a new resource back to the system), thereby providing an overall 'stateless' property for the system. By processing representations of the resources, a resource (e.g., model) is separated from implementation and the execution may perform non-blocking reads and writes while managing contention. The logic may be defined in a manner that preserves a loose-coupling between the stateless application resources (e.g., by associating the resources with one another using a set of declarative relations for a model resource 134). The association may be made directly, such as with explicit identifiers (e.g., Universal Resource Identifiers or URIs or 'links') and/or indirectly such as with metadata references that may be resolved by the intermediary component at run-time based on a context for the corresponding request and/or activity. Furthermore, the logic may be stored in a manner that does not require compilation to effect any changes. In this manner, a change to the application logic (e.g., one or more model resources 134) may be made immediately available.

By enabling the application, and the system as a whole, to be defined in a loosely-coupled fashion, the application may provide a dynamic software application framework having many desirable properties (e.g., reflection, under-specification, late-binding, and/or lazy evaluation), and may promote many advantages related to operational responsiveness (e.g., dynamic payload customization based on context and more efficient application development and change management capabilities) and development productivity (e.g., optimal re-use of resources, more efficient application development and change management capabilities).

During execution of the application, the intermediary component may receive interaction requests generated by the user 14. An interaction request may request that the application perform a corresponding activity, and may include a reference to one or more of the resources. In response, the intermediary component may dynamically configure each atomic operation for the activity based on its context, and dynamically determine a process flow for performing the activity based on the activity context at the conclusion of each atomic operation, for the entire lifecycle of the activity. The atomic operation of the framework for the application may be an individual system interaction that is performed by the intermediary component by calling a single resource (e.g., a model resource 134). In this case, the intermediary component comprises an agent acting between the user 14 requesting an atomic operation and the resource(s) configured to perform the atomic operation per the related model. The intermediary component provides a mechanism for evaluating the request relative to activity context, customizing the deliverable (payload) for each atomic operation and directing the user 14 to the next valid interaction(s) for continuing to perform the activity based on use of context information in support of the activity. In this manner, the intermediary component mediates interactions between the user 14 and a group of loosely-coupled resources to enable the user 14 to perform an activity using the application per the related models in the resources.

Figure 2:
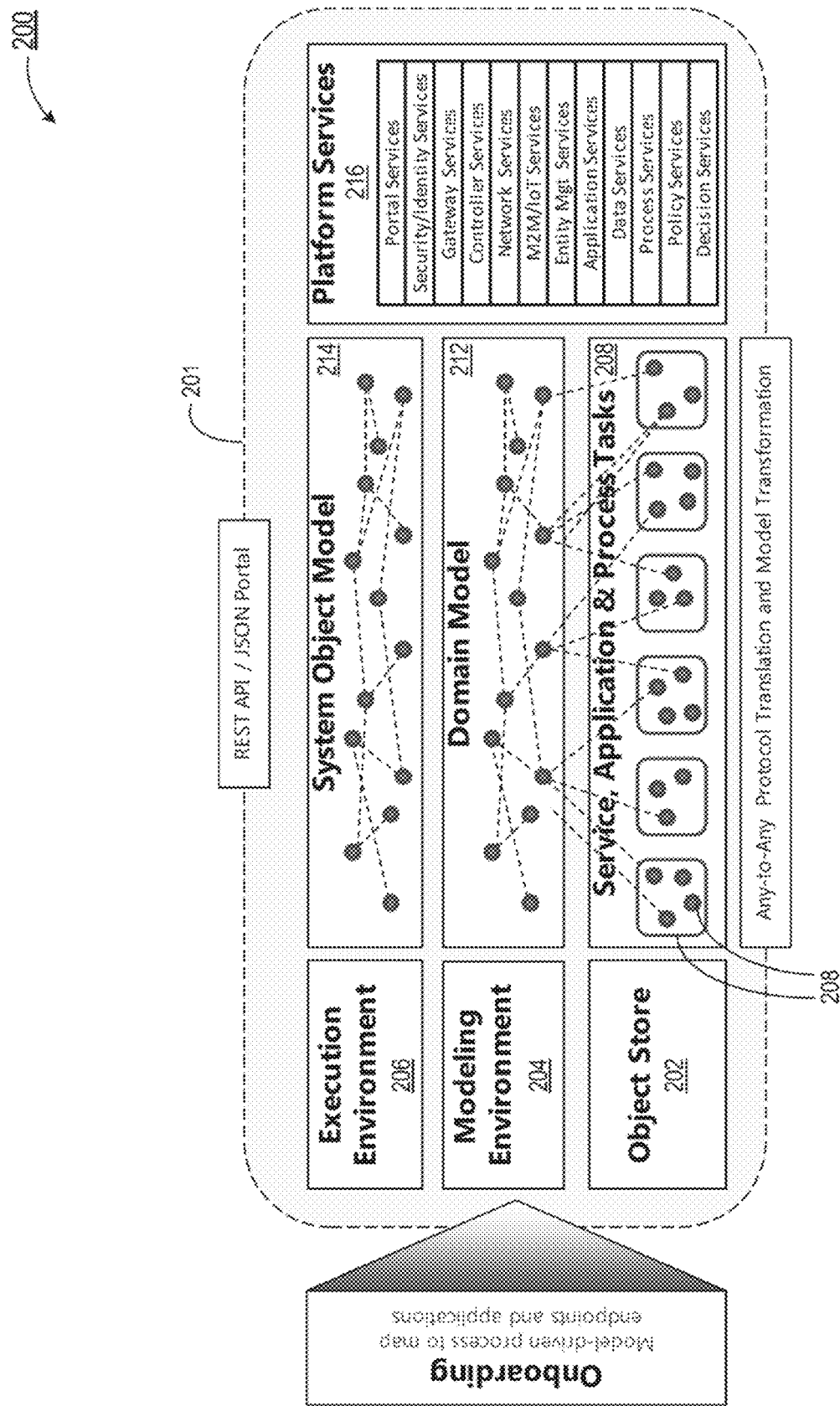
FIG. 2 depicts a diagram of an example of a system for interpreting, configuring and controlling objects (e.g., graph objects) according to some embodiments.

FIG. 2 depicts a diagram of an example of a system 200 for interpreting, configuring and controlling objects 208

(e.g., graph objects and/or other executable objects) according to some embodiments. The system 200 includes an object data store 202, a modeling environment 204, and an execution environment 206.

The object data store 202 may function to store and/or otherwise manage (e.g., create, read, update, and/or delete) objects 208 (e.g., base objects). Objects 208 may include base objects, graph objects, interpreted objects. As discussed herein, base objects may comprise a primitive with references. As also discussed herein, an interpreted object may be an interpretation of the base object. The interpreted object may be termed as a realized object or graph object. Objects 208 may be modeled using a declarative modeling language. Objects 208 may be logically connected (e.g., "linked" or "chained") to create a particular type of object 208 (e.g., a interpreted or task object). The objects 208 and the logical connections may be modeled using the same declarative modeling language.

The modeling environment 204 may function to declaratively model properties and behaviors of objects 208. The modeling environment 204 may include a domain model 212. The domain may be modeled as a set of loosely-coupled concepts and types, with conditional, policy-based, relationships to flexibly support alignment with real-world complexity of a scope of a service, application, line-of-business, enterprise, value-chain, industry, and/or the like. Modeling may be done directly within the modeling environment 204. In some embodiments, models maybe imported (e.g., RDF, OWL, or the like) from one or more other systems and/or environments.

In some embodiments, concepts are comprised of a set of business entities, with conditional, policy-based, relationships for dynamic schemas that support varied representations based on identity (e.g., role-based access control) and real-time interaction-context (e.g., a dynamic form). Business entities may be comprised by a set of properties (e.g., metadata and metrics) with conditional, policy-based, relationships.

In some embodiments, types are comprised of a set of attached implementations, with conditional, policy-based, relationships for dynamic behavior based on identity (e.g., role-based access control) and real-time interaction-context (e.g., closed-loop autonomic behavior). Implementations may reference internal libraries or a set of external services, APIs, systems, databases and devices. Conditions may represent 'decision gateways' with declarative policies, which may declare simple parameters to be completed with in-band metadata or may specify reflective policies with embedded queries, atomic functions, complex algorithms (e.g., other objects) prompting a broader evaluation of system state at run-time to dynamically generate a schema for a given context. Policies may reference internal libraries (e.g., local objects) or a set of external services, APIs and systems (e.g., remote objects).

The execution environment 206 may function to execute one or more platform services 216. In some embodiments, the platform services 216 may be represented by one or more system object models 214. In some embodiments, a declarative modeling language may be used to model objects and processes, which provides a common machine-readable design pattern for handling heterogeneous endpoints. It addresses fundamental complexity of connecting, coordinating, collaborating and controlling elements in Distributed Computing and Cyber-Physical System. This canonical approach to modeling, using metadata, links and constraints, provides a common denotational semantics for building rich, highly-modular solutions and achieving behavior from a set of independent, isolated and potentially autonomous elements. It may represent an implementation of a unified, performant and scalable approach to Abstract Rewriting Systems and Transition Systems, pursued most notably by British Computer Scientist and Turing Award winner, Robin Milner, throughout his entire academic career ending with his related work on bi-graphs.

Robin Milner is an inspiration to many contemporary programmers and visionaries. Mr. Milner once stated:

I think we are in a terrific tension between (a) finding a small set of primitives and (b) modelling the real world accurately.

We are trying to find fundaments. We should always be open to different applications, in case they can help us focus on a better fundamental notion.

Eventually people want, or I want them to want, to be able to talk about a process in the same way that they talk about a function. That's why I'm not interested in short-term gains!

(users.sussex.ac.uk/~mfb21/interviews/milner/). Inventors herein deeply appreciate and honor the career, contributions, and life of Robin Milner.

In some embodiments, all objects 208 may be declaratively modeled using the Graph Object and Action Language (GOAL), providing a common machine-readable pattern, representing an invariant or canonical model of an object 208.

The system 200 may be reflexive in that objects 208 may be declaratively composed into higher-level services, apps and processes using the same language (in one example, everything is an object 208).

In some embodiments, the system's 200 processing of objects 208 follows a canonical microflow program. System primitives act as invariants, allowing normalized execution by the system agent in arbitrary and volatile domains.

1. The agent handles events (requests, events) for objects, processing Functional and Non-Functional Concerns. The Agent interprets Objects at run-time in a dynamic dataflow process, the canonical System microflow.
2. The agent uses live metadata and real-time state to resolve all conditions (i.e., translate policies, execute queries, functions and algorithms as specified) to define the set of applicable set of relationships to types, concepts and policies (e.g., Dynamic Type and Schema).
3. The agent executes all necessary connections and processing details of the underlying elements including license keys and certifications, protocol translations, data format transformations (e.g., bus, gateway, mediator like capabilities) to construct a 'context-aware' representation of the Object, in real-time; which personalizes user-experience, while enforcing contracts.

The aforementioned operations of the systems canonical microflow may be non-linear, and the agent may be executing a Functional Program, which may not require an ordered set of operations, rather it builds closures over its activities. Execution supports goal-oriented, data-driven, policy-controlled parallel processing with optimistic concurrency and policy-based consistency.

In some embodiments, an agent functions as a generic, highly-efficient, performant, scalable and resilient graph processing engine, which supports modeling with the GOAL in the platform's design environment, as well as the execution environment's interpretation of GOAL-based objects.

In some embodiments, objects 208 may relate to category theory and the related processing of such objects is referred to as abstract rewriting. The abstract rewriting implements multi-paradigmatic functional, reflective and dataflow programming concepts. In this context, the object is a Monad and the agents are Monadic transformers. The agents relate to actor theory and the platform itself relates to coordination theory (generalized theory, coordinating tasks with interdependencies).

Figure 3:
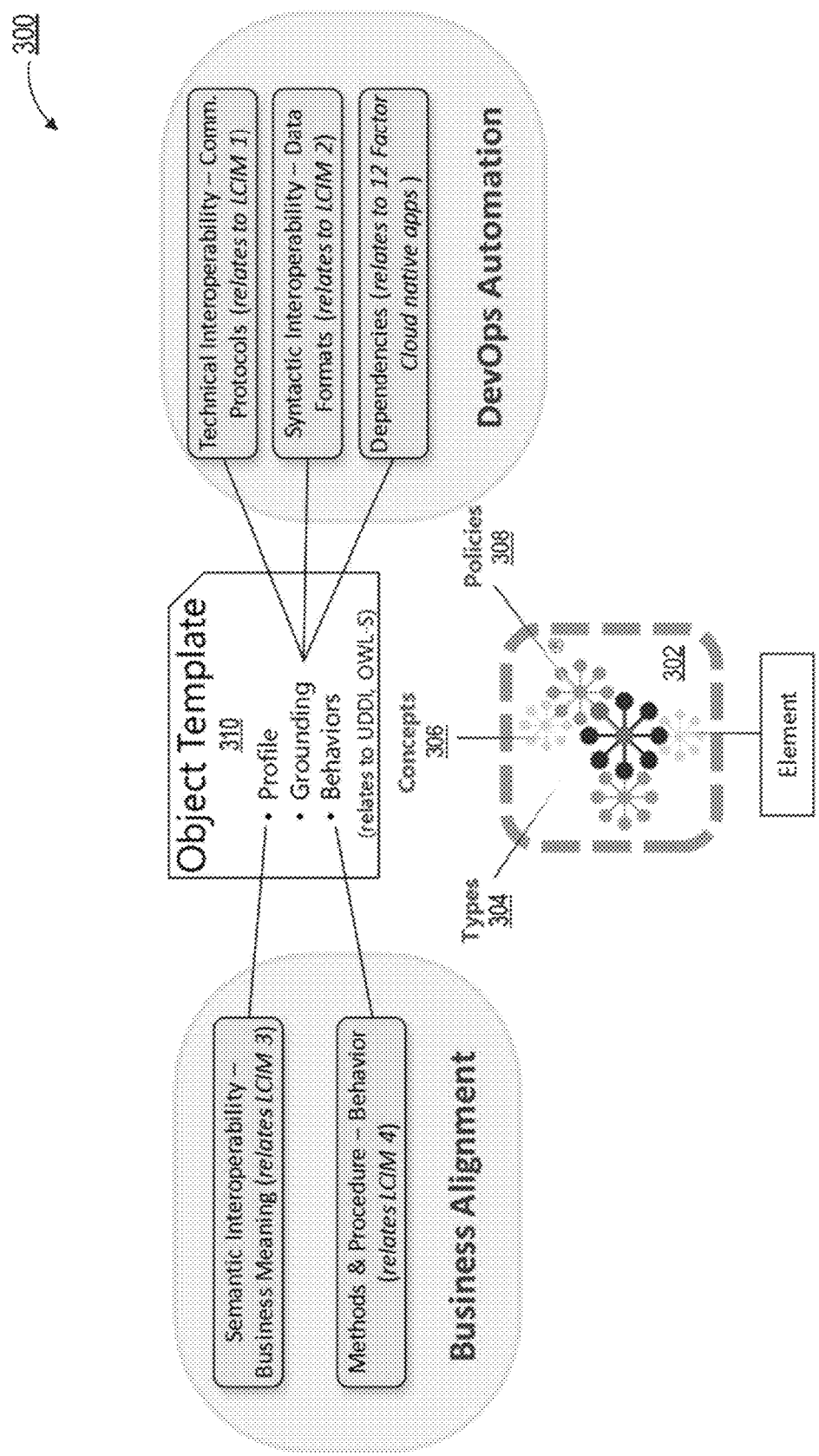
FIG. 3 depicts a diagram of an example of an object according to some embodiments.

FIG. 3 depicts a diagram 300 of an example of an object 302 (e.g., a base object 208) according to some embodiments. The object 302 includes types 304, concepts 306, and policies 308. The types 304, concepts 306, and/or policies 308 may comprise references to corresponding types, concepts, and/or policies of an ontology and/or domain model (e.g., of one or more domain models such as a domain model 212).

In some embodiments, objects 302 may be modeled using a declarative modeling language. The language may model remote endpoints (e.g., services, APIs, systems, databases, devices, or the like), on-boarded application packages, and imported files or libraries as executable objects with a graph topology. In some embodiments, a design environment (e.g., modeling environment 204) may be accessed via a REST API or JSON-based portal. The design environment may enable technical staff to map properties, behaviors, constraints and dependencies to domain concepts and types. The graph topology represents mappings as a set of conditional, policy-based relationships, which allow one-or-more implementations of an object based on prototypal, non-hierarchical, inheritance.

With GOAL, objects 302 may have a logical model that references a conceptual model of a domain (e.g., an ontology), which also describes its physical model (e.g., implementations); eliminating or reducing system overhead and supporting greater expressivity and adaptability of the system. Objects are loosely-coupled to their underlying elements, to each other and to the domain model for a complete separation of concerns and a completely metadata configurable environment.

By mapping all connected elements to a common domain model, the platform may accommodate heterogeneous interfaces with diverse formats, data protocols and support interoperability with third party components (middleware, tools, runtimes, etc.), databases, network resources and devices/machines where specified which may relax constraints to promote interoperability and allow the system boundaries to be extended in a natural manner.

Objects 302 may comprise rich entities with software contracts that specify non-functional concerns, wrapping endpoints with centralized policies for i) consistent enforcement of security/identity (e.g., role-based access control, license keys, certifications and authorizations), ii) business-compliance, iii) IT governance, and iv) system controls (e.g., state management, consistency, etc.) thereby enabling common management of heterogeneous objects (local and remote).

In some embodiments, objects 302 include pre-conditions and/or post-conditions. The pre-conditions and/or post-conditions may include one or more software contracts wrapping the object 302. Pre-conditions may provide hooks for permissions (e.g., client privileges and access mechanisms to read, write, execute an object), which may support the configuration and enforcement of security and identity policies. Post-conditions may provide hooks for other non-functional concerns, enabling the configuration and enforcement of business compliance, IT governance and system control policies.

In some embodiments, post-conditions provide hooks for users to subscribe to events on an object. The domain provides metadata and metrics for policies, which allow users to declaratively specify logic for their specific events of interest. On the occurrence of an event, the system agent executes the Object's post-conditions and publishes state changes to subscribers as per their policies, which may be used for alerts and notifications.

In some embodiments, post-conditions also provide hooks for transition policies, allowing task objects to be logically chained in non-linear processes based on conditional, policy-based, events (Pub/Sub-style) and conditional, policy-based, links (Hypermedia As The Engine Of Application State-style or HATEOAS-style pattern). Publish/Subscribe-style (Pub/Sub-style pattern) capabilities may be used to model event-based triggers to launch a new process or advance an existing process that was in a 'wait' state, while HATEOAS-style link capabilities allow modeling of acyclic process chains (infinite state machine), which supports complex exception paths. The declarative implementation of both styles allows for lightweight, loosely-coupled and asynchronous task flows.

In some embodiments, objects 302 may be persisted in an unstructured, web-style key-value system store. They are all dynamically indexed for discovery and re-use, tagged for relationships to other objects and version-controlled for lifecycle management and audit history. The metadata is available for discovery, composition, orchestration and policies. Objects 302 may each have a profile that may be viewed directly through the platform's portal, based on group security. Objects may optionally expose a public API. Objects may be declaratively composed into higher-level domains, services, applications and processes that may share the domain in order to efficiently interoperate and coordinate tasks.

The domain model-based approach may support the use of shared concepts and types as semantically-related building blocks that support rapid prototyping and simple re-configuration of solutions, enabling improved IT productivity, integrated operations and business agility. In some embodiments, the domain model provides shared concepts and types that represent an extensible set of semantically-related building blocks that may be shared across processes for integrated operations.

In some embodiments, the domain model functions like an application fabric or metadata backplane allowing for tasks to coordinate across business silos, layers of Information Technology, administrative domains, organizational boundaries and industry standards. The domain model may also connect across deployment models (e.g., server, virtual machine or container-based processes) and devices and machines (e.g., Internet-of-Things).

In some embodiments, dynamic, dataflow processes may be modeled (e.g., using the same Graph Object and Action Language (GOAL™)), as a set of loosely-coupled tasks objects (or, simply, "tasks"), with conditional, policy-based, relationships. In some embodiments, all objects 302 include pre-conditions and/or post-conditions in their software contracts. Post-conditions may enable tasks to be logically chained in a non-linear processes by conditional, policy-based, events (e.g., Pub/Sub) and conditional, policy-based, links (e.g., HATEOAS).

In some embodiments, post-conditions provide hooks for users to subscribe to events on an object. The domain provides metadata and metrics for policies, which allow users to declaratively specify logic for their specific events of interest (e.g., filters) and to configure the message they want to receive (e.g., data model) upon a relevant event. Conditions may represent 'Decision Gateways' with declarative policies, which may declare simple parameters to be completed with in-band metadata or may specify reflective policies with embedded queries, atomic functions, complex algorithms (e.g., other objects) prompting a broader evaluation of system state at run-time to define advanced subscriber rules.

In operation, the agent (e.g., in response to an event or interaction) may execute an object's post-conditions and publish state changes to subscribers as per their policies, which may be used for alerts and notifications, as well as event-based triggers to launch a new process or advance an existing process that was in a 'wait' state. This approach may provide lightweight, configurable, high-performance Complex Events using a single-notation and execution environment.

In some embodiments, task objects have an additional attribute on their contract post-conditions. For example, task objects may have an attribute for the ability to specify conditional, policy-based, links. This approach may align with the notion of Hypermedia links on the web and more formally, HATEOAS in REST-style architecture. The systems described herein may extend this further with its own implementation of linked data, which connects post-condition policies to domain metadata and metrics, which may provide the application logic for configuring and controlling dynamic dataflow processes.

In some embodiments, conditions may represent 'decision gateways' with declarative policies, which may declare simple parameters to be completed with in-band metadata or may specify reflective policies with embedded queries, atomic functions, complex algorithms (e.g., other objects 208) prompting a broader evaluation of system state at run-time to dynamically generate next recommended or directed actions. This approach may provide lightweight, configurable, asynchronous, highly-scalable hypermedia flows using a single-notation and execution environment. In some embodiments, post-condition, policy-based links may leverage the dynamic execution environment to include reflective policies that prompt evaluation of system state to optimize the flow of tasks at run-time (e.g., recommending or directing next best actions and supporting event-driven closed-loop autonomic behavior).

In some embodiments, tasks may be modeled as a set of loosely-coupled operations, with conditional, policy-based, relationships. The domain may provide metadata and metrics for policies, which provide the application logic for the task. Operations may be logically chained by conditional, policy-based, links (HATEOAS) and conditional, policy-based, events (Pub Sub) as a processing pipeline (various types). The domain provides metadata and metrics for policies, which provide the application logic for configuring and controlling the pipeline.

In some embodiments, conditions may represent 'decision gateways' with declarative policies, which may declare simple parameters to be completed with in-band metadata or may specify reflective policies with embedded queries, atomic functions, complex algorithms (e.g., other objects 208) prompting a broader evaluation of system state at run-time to dynamically optimize the behavior of an individual task (e.g., personalizing user-experiences and enforcing non-functional concerns).

In some embodiments, task types accelerate development by providing re-usable building blocks for routine modeling requirements. In addition to standard properties, task types may have attached behaviors, lower-level system objects, which represent common patterns for message exchange, coordination, enterprise application integration (EAI), work-flow, data integration pipelines, DevOps automation, cloud computing, carrier virtualization and generic controllers. Task types may be nested in complex processes that support end-to-end automation from human process and mashups to service orchestration and resource provisioning. Task types may be comprehensive, providing a unified workbench for rapidly prototyping, testing, deploying, running and managing processes.

In some embodiments, objects 302 may be created with a model-driven object template 310. The object template 310 may capture a rich model of an endpoint (e.g., element) so the system may automate interoperability. Interoperability may include technical interoperability (e.g., communication protocols) and/or syntactic interoperability (e.g., data formats). The object template 310 may declare dependencies, such as code repositories, target hosts, port bindings, environment variables, middleware components, engines, runtimes, databases, operating systems, and/or the like.

Figure 4:
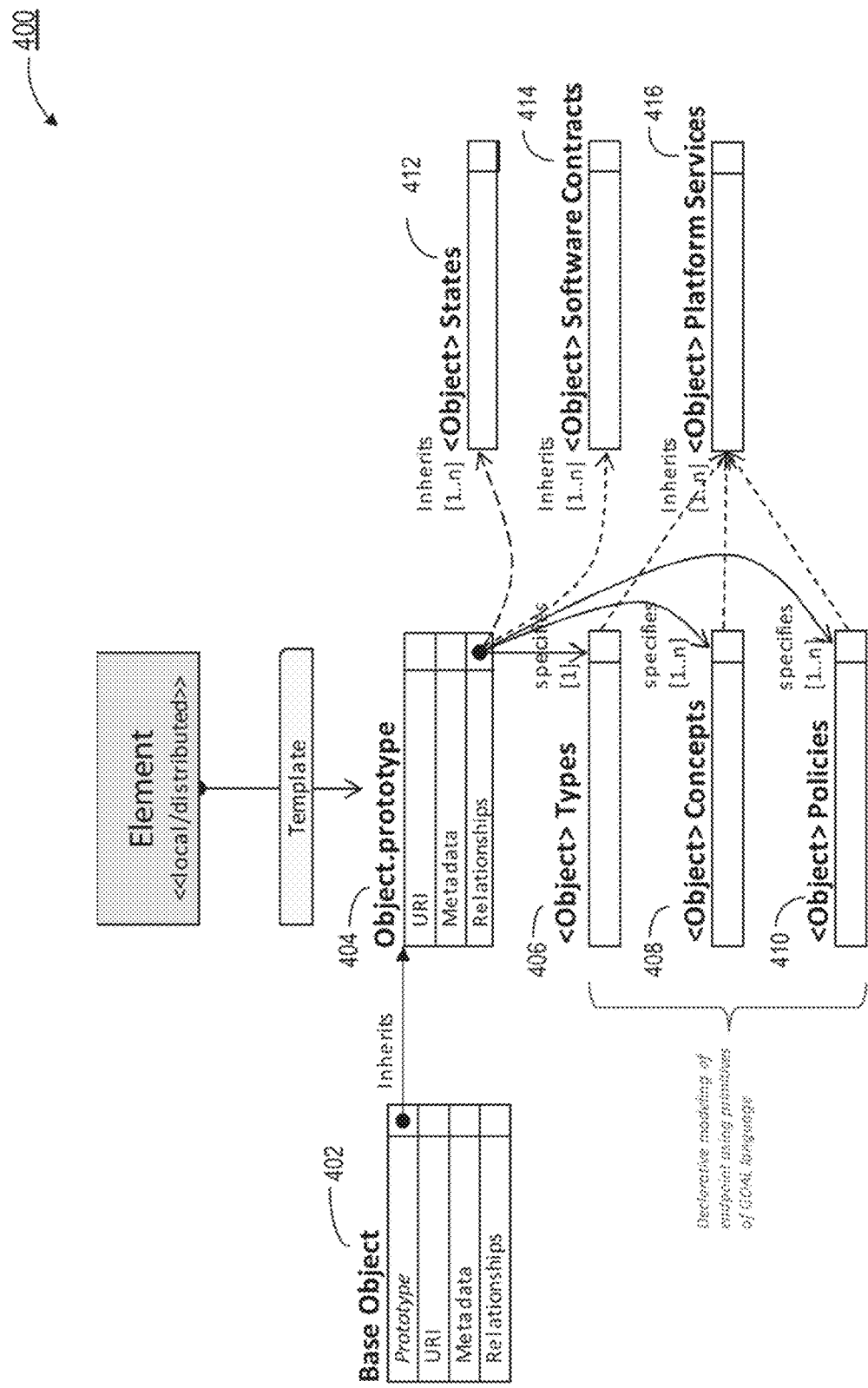
FIG. 4 depicts a diagram of an example of an object model according to some embodiments.

FIG. 4 depicts a diagram 400 of an example of an object model according to some embodiments. In some embodiments, a prototype object 404 is created and/or interpreted from a base object 402. The base object 402 may comprise set of primitives (e.g., URI, metadata, relationships, and/or the like) which may be inherited by the prototype object 404. The relationships of the prototype object 404, may include and/or reference one or more types 406, concepts 408, policies 410, states 412, software contracts 414, and/or platform services 416.

In some embodiments, software contracts 414 wrap objects which may enable consistent governance of heterogeneous and distributed endpoints and/or objects. Software contracts may wrap objects to enable centralized management of non-functional concerns (e.g., security, identity management, business compliance, IT governance, and/or the like). The software contracts may include one or more pre-conditions and/or post-conditions. For example, pre-conditions may provide hooks for permissions (e.g., client privileges and access mechanisms to read, write, execute an object), which may support the configuration and/or enforcement of security and/or identity policies. Post-conditions may provide, for example, hooks for the configuration and enforcement of business compliance, IT governance and system control policies, as well as hooks for configuration and execution of Pub/Sub policies and transition policies for task flows based on hyperlinks.

Developers may not be required to code and maintain non-functional concerns per application as related policies and services may be automatically inherited from the base object providing fine-grained control. The system handles software contracts at run-time enforcing policies and performing services. This may eliminate complex development work and may enable consistent governance. Software contracts may include object management and the related policies implement the system's functional persistence model (i.e., log-style, append-only, and immutable).

In some embodiments, every object has a linked-list of states (i.e., directed acyclic graph). The approach supports universal version control and audit history over every object, regardless of type and enables "diffs" to be performed to highlight deltas between versions. Functional Persistence also supports reasoning over the correctness of code.

The platform services 416 may include middleware capabilities inherited through the type system and automatically linked to the object graph. The middleware capabilities may include portal services (e.g., browser-based JSON portal (cross-platform)), dynamic applications, work-lists, forms, enterprise search, UI-Integration (e.g., templates, content, mashups), security services (e.g., identity, role-based access control, single sign-on authentication/authorization protocols (such as Kerberos, OAuth, SAML, XACML, or the like), certification and credential management, encryption in-flight/at-rest), gateway services (e.g., Modeling/onboarding endpoints (service, API, system, database, device)), protocol translation, data type transformations, entity mapping, proxy services, fault management, controller services (e.g., automate configuration and control), network services (e.g., network integration (virtual functions, orchestrators, target hosts, network resources)), M2M/IoT services (e.g., Machine/Device Integration (sensors, actuators, gateways)), entity management services (e.g., Lifecycle management of all system objects (models and instances, apps and data, nodes and machines/devices)), application services (e.g., application integration, data services (e.g., data integration (structured, semi-structured and un-structured)), process services (e.g., service choreography and orchestration, system and human workflows, collaboration), policy services (e.g., enforcement and execution of declarative policies), decision services (e.g., decision tables, decision trees)).

In some embodiments, developers do not have to manually integrate or even specify platform services, rather they are inherited from the type system. The system may handle any necessary connections, transformations, integration, and/or the like, at run-time. This may eliminate and/or reduce tedious and/or redundant integration work, and may enable declarative composition of higher-level services, applications and processes.

Figure 5:
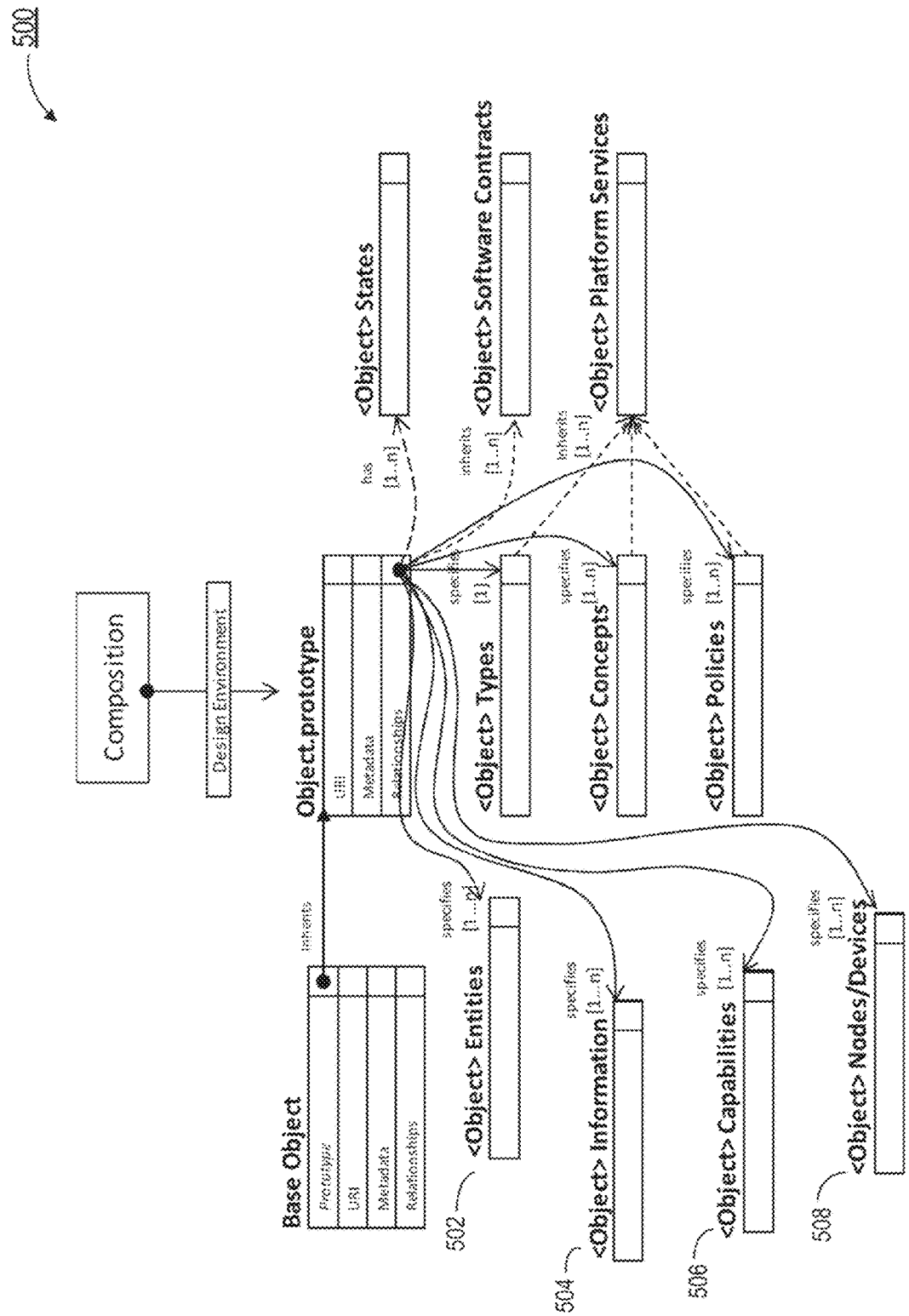
FIG. 5 depicts a diagram of an example of modeling as a declarative composition of objects according to some embodiments.

FIG. 5 depicts a diagram 500 of an example of modeling as a declarative composition of objects according to some embodiments. As shown, a design environment (e.g., modeling environment 204) may be used to specify one or more relationships of an object (e.g., entities 502, information 504, capabilities 506, and nodes/devices 508). Entities 502 may include, for example, people, organizations, or the like. Information 504 may include, for example, documents, statistics, logs, or the like. Capabilities 506 may include, for example, functions, queries, algorithms, or the like. Nodes/ devices 508 may include, for example, servers, sensors, or the like.

One example of a declarative composition of objects is a cloud application for content management, with relationships to entities 502 such as documents, media and users, to information 504 such as encoding formats and media types, to capabilities 506 such as encryption, authentication, caching and charging, and to nodes/devices 508 such as file servers and network attached storage.

An example of a declarative composition of objects is an Internet of Things (IoT) application for automating industrial manufacturing, with relationships to entities 502 such as products, orders, materials and locations, to information 504 such as product specifications and machine specifications, to capabilities 506 such as machine activation, machine configuration, machining simulation, metric collection and metric aggregation, and nodes/devices 508 such as welding robots, 3D printers and atmospheric sensors for temperatures, pressure, moisture, etc.

An example of a declarative composition of objects is an algorithm to calculate budget costs for a person on a project, with relationships to entities 502 such as organizations, departments and people, to information 504 such as organizational facts, project parameters, pay scales, benefits schedules, inflation schedules, to capabilities 506 such as functions for calculating time on project, future value, benefits, overheads and full cost to project, and nodes/ devices 508 such as integrated payroll and human resources systems.

Figure 6:
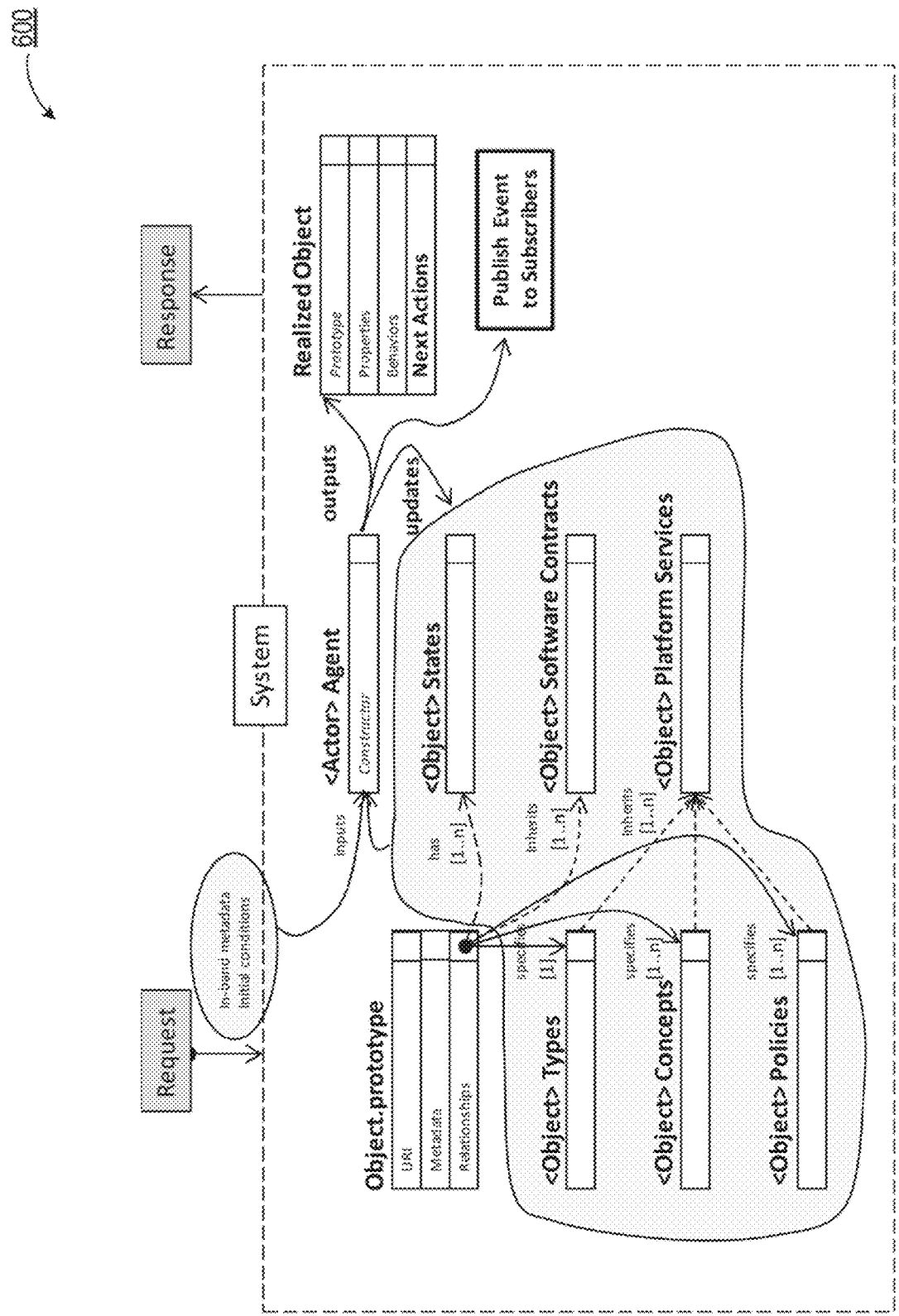
FIG. 6 depicts a diagram of an example of a transaction model according to some embodiments.

FIG. 6 depicts a diagram 600 of an example of a transaction model according to some embodiments. In the example of FIG. 6, the system 602 (through agent 606) receives a request 604 (e.g., associated with an interaction). The system may use a prototype object 404 and a real-time context (e.g., based on in-band metadata 606) to construct (or, interpret) a realized object 610 (which may be termed as an interpreted object). The realized object 610 may be provided in a response 612 from the system 602. Events may be published to subscribers in a HATEOAS process. In some embodiments, objects may be updated and/or otherwise modified (e.g., based on additional real-time context).

Figure 7:
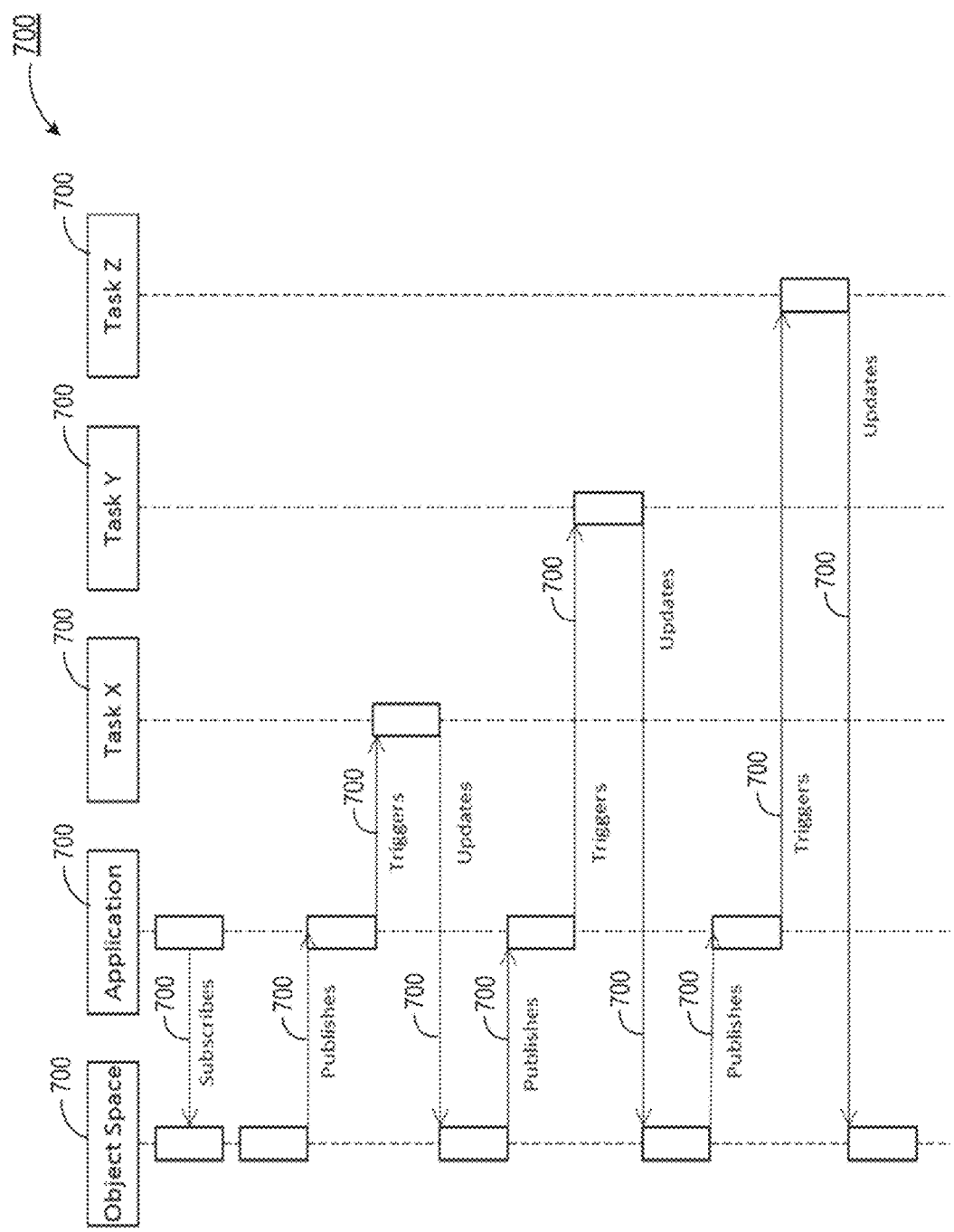
FIG. 7 depicts a sequence diagram of an example of a method of a non-linear process associated with a set of asynchronous interactions connected by next actions or subscribed events (or, "interactions") according to some embodiments.

FIG. 7 depicts a sequence diagram 700 of an example of a method of a non-linear process associated with a set of asynchronous interactions connected by next actions or subscribed events (or, "interactions") according to some embodiments. Workflows consist of loosely-coupled tasks to enable dynamic, non-linear processes and decouple state from process to support web-scale, dataflow processes. In this and other diagrams, the diagram illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

In step, 702, an application (e.g., represented by one or more objects) subscribes to an object and/or an interaction associated with an object. In step 704, the object publishes to the application, which triggers a first task (step 706). In step 708, the first task updates the object. In step 710, the object publishes to the application, which triggers a second task (step 712). In step 714, the second task updates the object. In step 716, the object publishes to the application, which triggers a third task (step 718). In step 720, the third task updates the object. This may continue for any number of steps.

Figure 8:
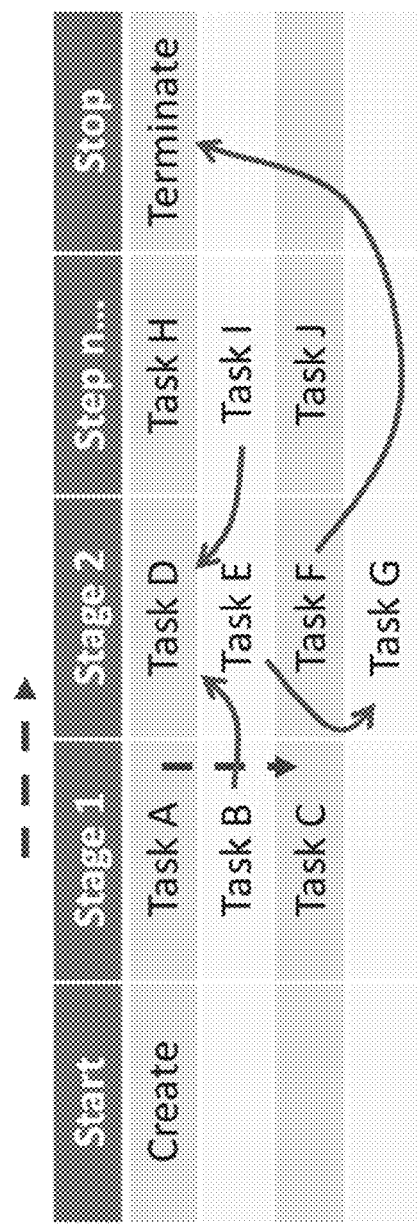
FIG. 8 depicts a state chart of an example of a model of a process according to some embodiments.

FIG. 8 depicts a state chart 800 of an example of a model of a process according to some embodiments. A process may be modeled indirectly as a set of tasks, which specify next actions as link relations to other tasks. The tasks represent potential states of a process and are organized into stages to provide a logical structure (i.e., state chart) for comprehending non-linear processes. In some embodiments, an acyclic graph model allows one-to-many conditional relationships between tasks to support logical exception paths based on context (e.g., as opposed to a statically encoded flowchart or state chart).

Figure 9:
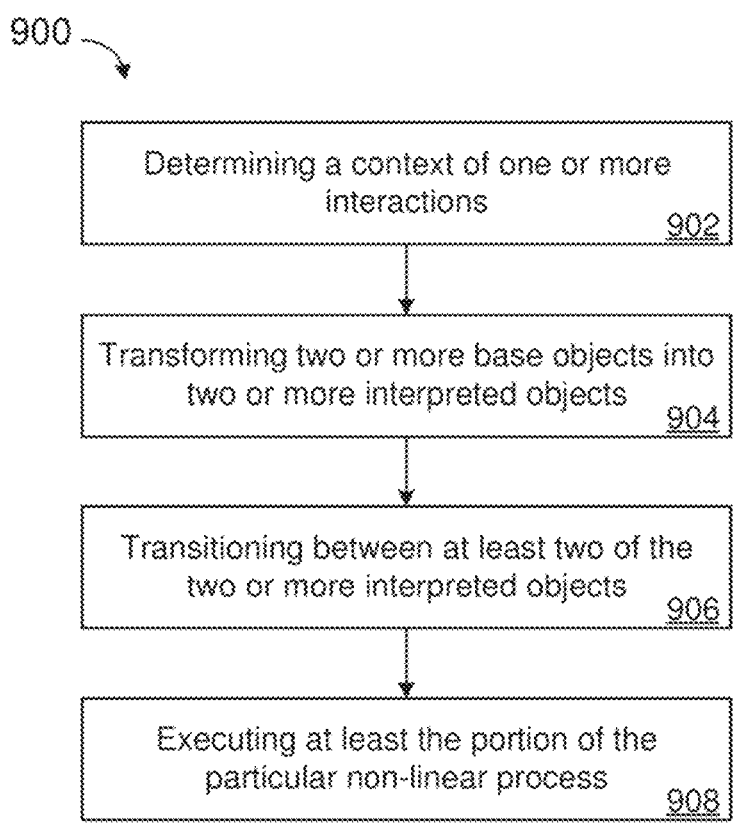
FIG. 9 depicts a flowchart of an example of a method of interpreting, configuring and controlling objects according to some embodiments.

FIG. 9 depicts a flowchart 900 of an example of a method of interpreting, configuring and controlling objects according to some embodiments.

In step 902, a computing system (e.g., one or more computer systems 152 and/or system 200) determines a context of one or more interactions (e.g., using one or more agents).

In step 904, the computing system transforms two or more base objects (e.g., base objects 402 and/or prototype objects 404) into two or more interpreted objects (e.g., prototype objects 505 and/or realized objects 612) by interpreting the two or more base objects based on evaluation of the context (e.g., performed by the computing system), and by resolving references of the two or more base objects relative to domain model types and concepts (e.g., domain model 212), each of the two or more base objects modeled using a same declarative modeling language (e.g., GOAL), the same declarative modeling language enabling transitions between the two or more interpreted objects, at least one of the two or more interpreted objects including at least one post-condition, the at least one post-condition providing hooks for transition policies which allow the at least one of the two or more interpreted objects to be logically chained in a non-linear process.

In step 906, the computing system transitions between at least two of the two or more interpreted objects by chaining the at least two of the two or more interpreted objects based on a particular post-condition of a particular interpreted object of the at least two of the two or more interpreted objects to create at least a portion of a particular non-linear process. In step 908, the computing system executes at least the portion of the particular non-linear process (e.g., to perform one or more platform services, and/or portions of platform services).

Figure 10:
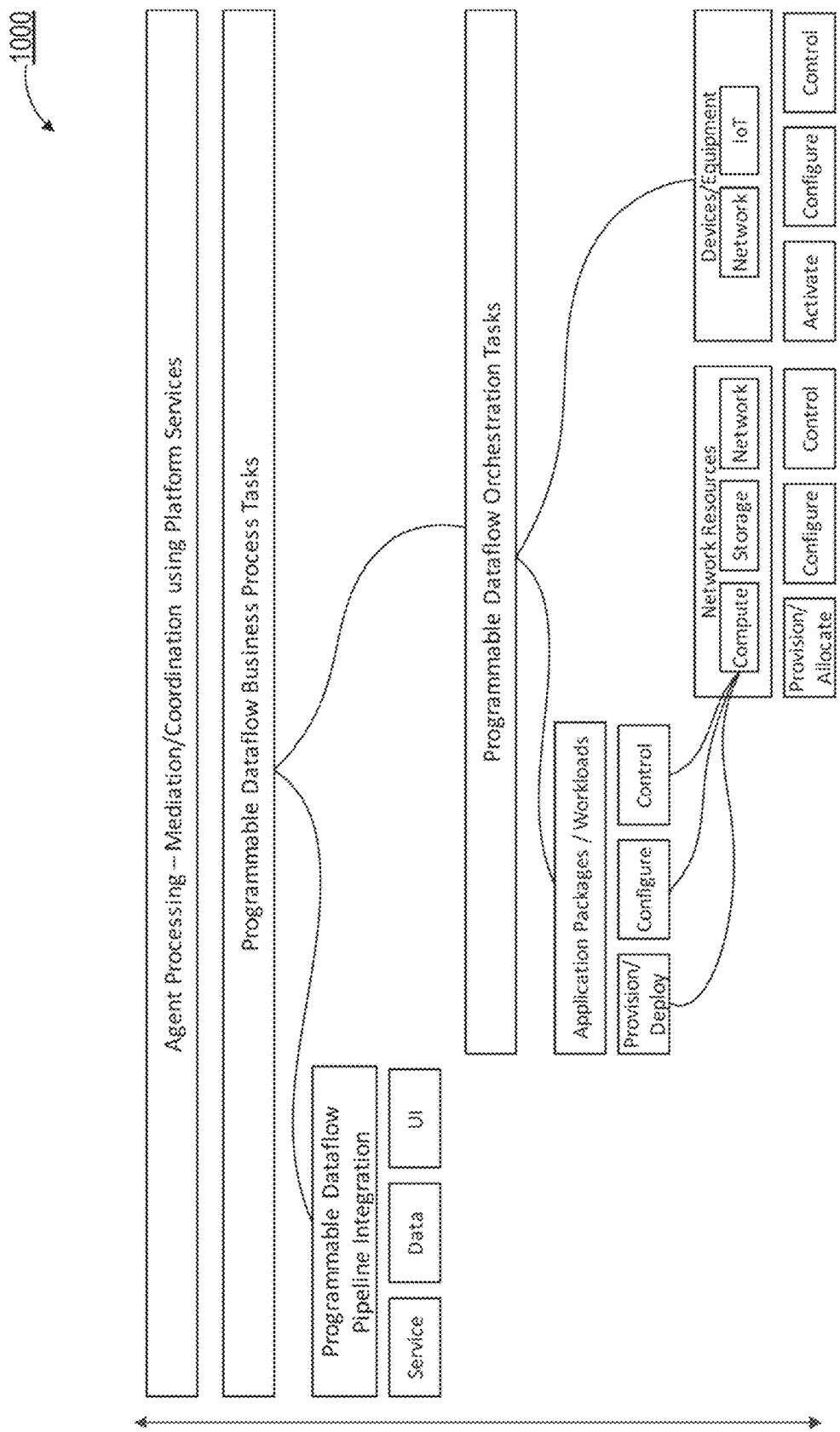
FIG. 10 depicts a diagram of an example of a unified execution system according to some embodiments.

FIG. 10 depicts a diagram of an example of a unified execution system 1000 according to some embodiments. In various embodiments, interpreting objects as discussed herein using the GOAL language enables management of workflows that may run inside compute of network resources. In some embodiments, the system 200 enables the unified execution system 1000 to streamline solution architecture, eliminate hops, join, context-switching, and/or the like, gain flexibility, extensibility, and/or adaptability, and achieve unified governance. The unified execution system 1000 may include some or all of the features of a unified operating system (e.g., as described in U.S. patent application Ser. No. 15/417,122, filed on Jan. 26, 2017, and entitled "Unified Operating System for Distributed Computing," which is incorporated herein by reference). In various embodiments, other systems described herein may include some or all of the features of a unified operating system.

Figure 11:
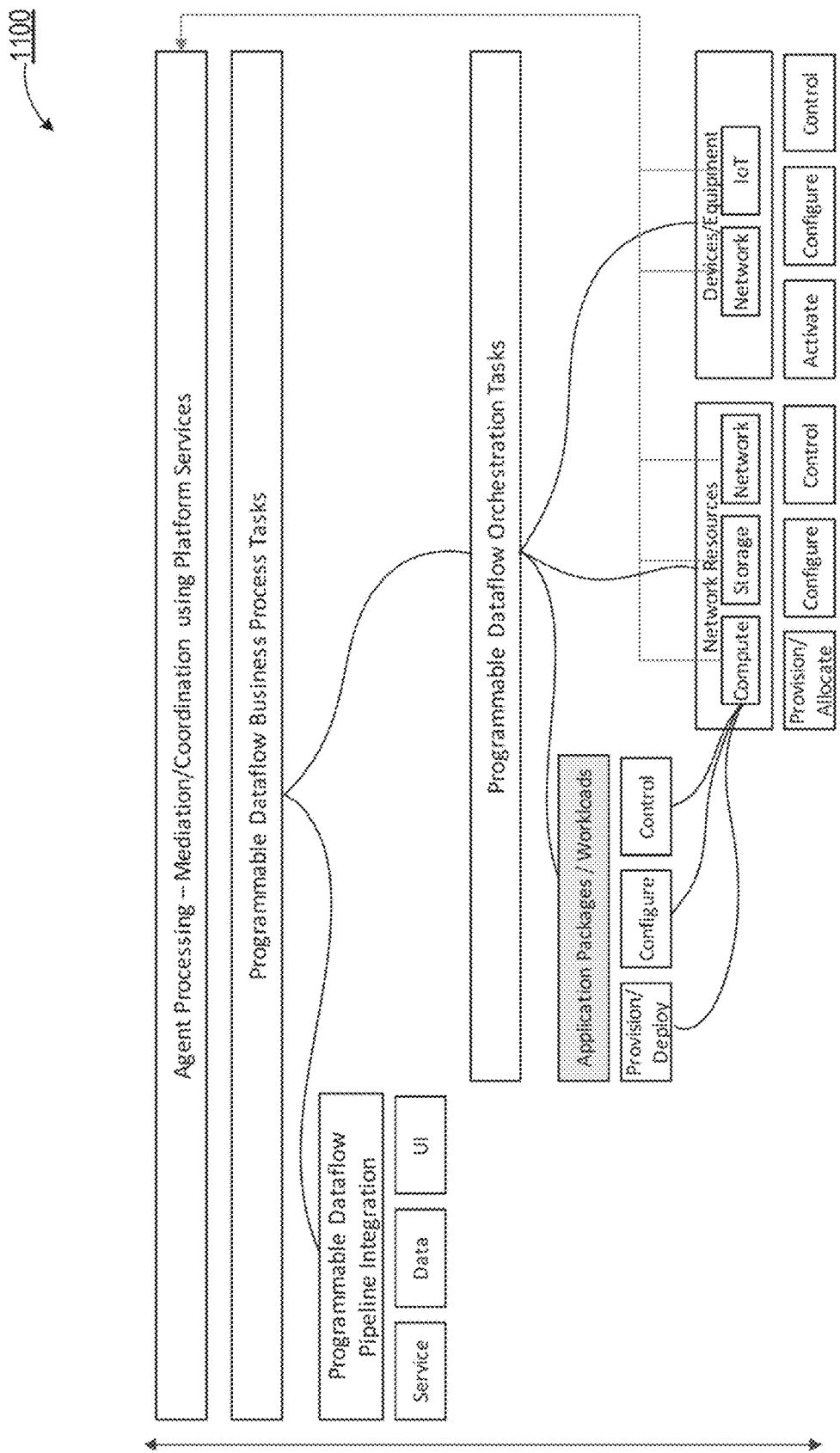
FIG. 11 depicts a diagram of an example of a closed-loop control system according to some embodiments.

FIG. 11 depicts a diagram of an example of a closed-loop control system 1100 according to some embodiments. In some embodiments, the system 200 enables the closed-loop control system 1100 to pull back data from connected interfaces interactively during the course of executions and on events to optimize automated decision-making with real-time live state. In some embodiments, the system 200 enables the closed-loop control system 1100 to deploy, manage and communicate with monitoring services or components that provide assurance and closed-loop control. In some embodiments, the system 200 facilities smart automation for event-driven systems that require control loops to optimize performance, deployments or configurations (e.g., load-balancing; predictive maintenance, network function virtualization, asset management, or the like) and may involve human intervention (e.g., service calls, service redesign, proactive customer service, or the like).

Figure 12:
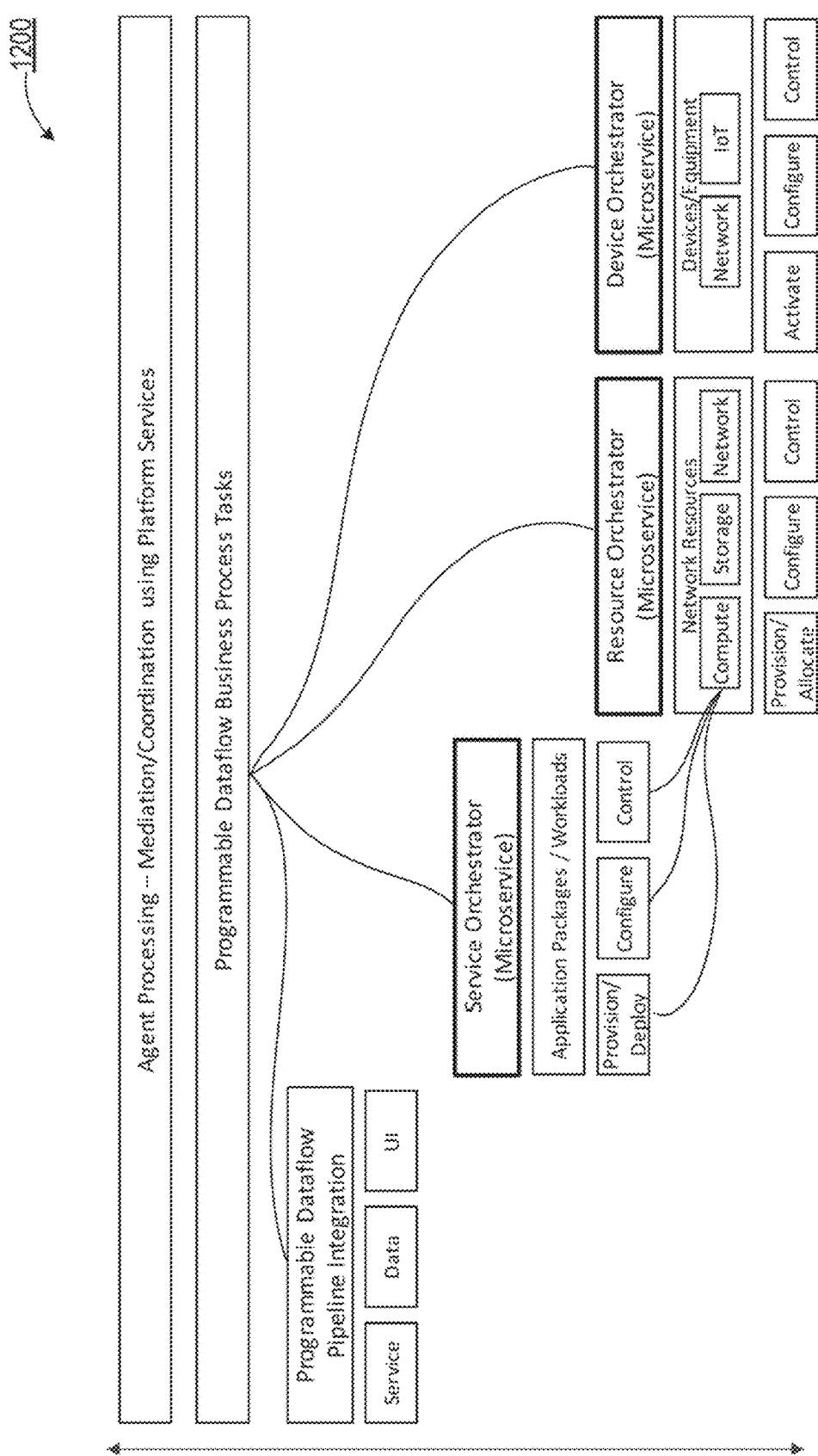
FIG. 12 depicts a diagram of an example of a system for distributing processing in micro-services according to some embodiments.

FIG. 12 depicts a diagram of an example of a system 1200 for distributing processing in micro-services according to some embodiments. In some embodiments, the system 200 can be decomposed into a set of micro-services for independent management, scaling and disaster recovery, which may be coordinated like any other connected endpoint.

Figure 13:
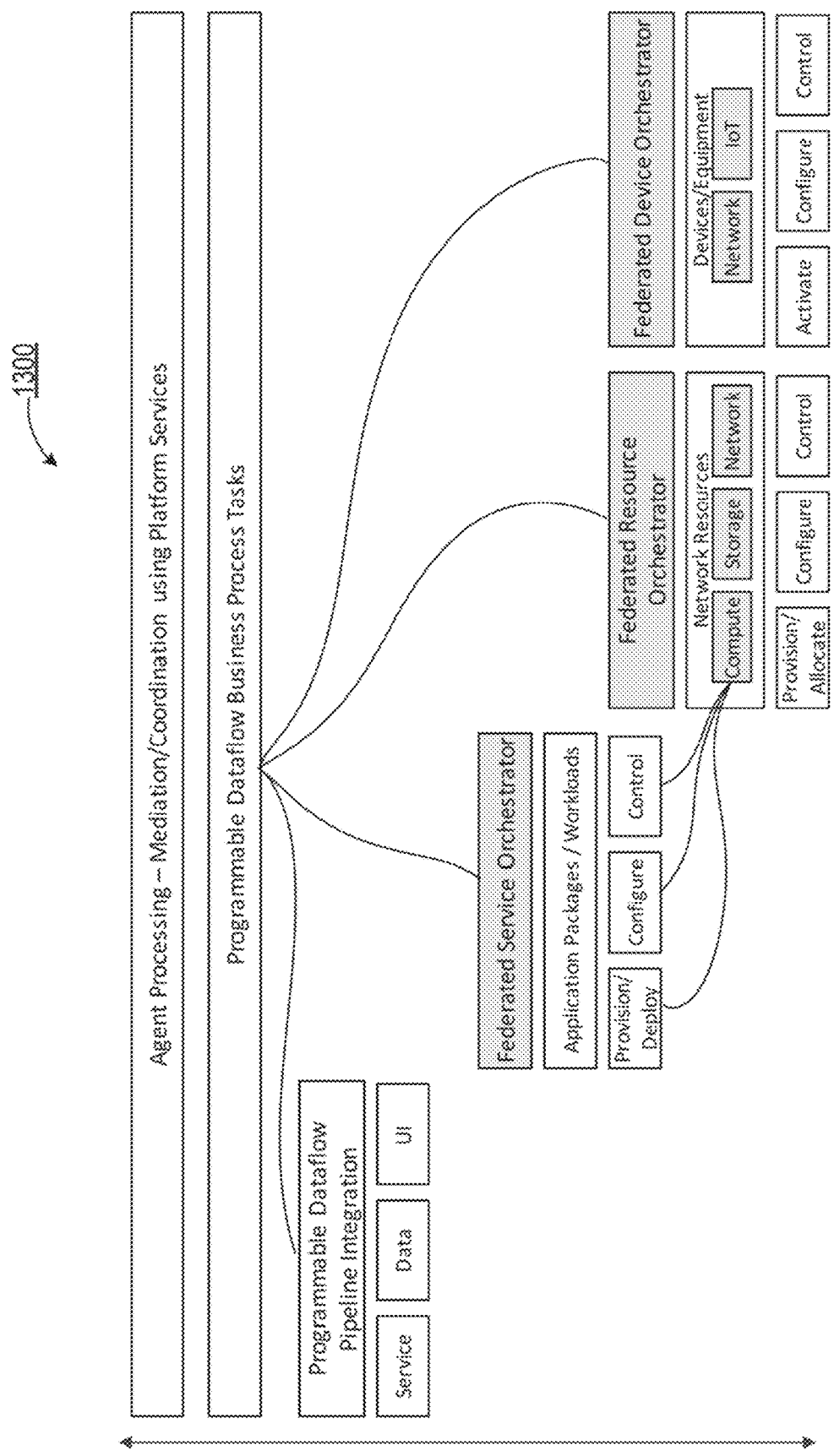
FIG. 13 depicts a diagram of an example of a federated orchestrator and a federated controller according to some embodiments.

FIG. 13 depicts a diagram of an example of a system 1300 including a federated orchestrator and a federated controller according to some embodiments. In some embodiments, the system 200 enables the system 1300 to integrate with any combination of orchestrators, domain controllers and automation tools and dynamically coordinate behavior across a set of collaborating services.

In some embodiments, systems and methods may drop down to any "level" of task type, many times, in any order, as necessary to fulfill higher-level business logic of a composite application involving two or more elements.

As discussed herein, in some embodiments, task types may be nested in complex processes that support end-to-end automation from human process and mashups to service orchestration and resource provisioning. It will be appreciated that many operations are at the system integration level for interoperability between heterogeneous elements, which may include connecting remote endpoints, handling license keys and certifications, as well as transformation, translation and mediation as may be necessary whereby the configuration and control of each participating element may be directed by live metadata and real-time state.

In some embodiments, the agent may require state (e.g., reflection and look-ups) and additional processing (e.g., queries, functions, algorithms) to resolve policy-based conditions.

In some embodiments, the execution of specific orchestration tasks over services, resources and devices may represent the minority of agent processing activity relative to the Input/Output (i.e., "I/O") and compute-intensive activity of interpreting objects and making real-time context-enhanced decisions in order to optimize the execution orchestration tasks. It will be appreciated that in some embodiments, the overall end-to-end processing of a transaction by the agent based on the systems and methods is more performant, scalable and resilient by design than conventional methods previously described.

Figure 14:
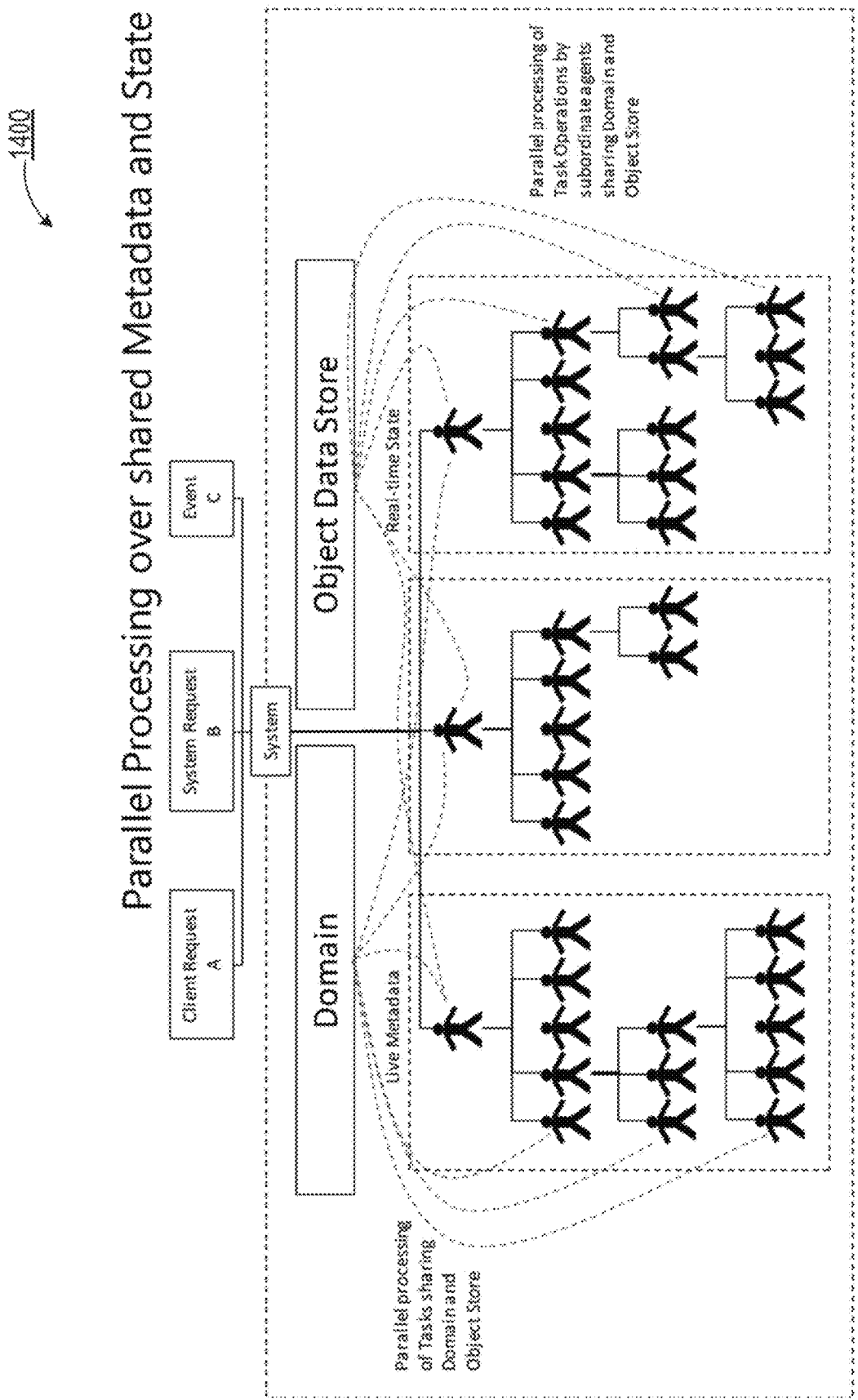
FIG. 14 depicts an example of multiple discrete interactions, processing in parallel by separate agents acting as transaction managers for each interaction, which in turn may distribute work for parallel processing to multiple subordinate agents (responding to the request of the transaction managers, enacting the same protocol).

FIG. 14 depicts an example 1400 of multiple discrete interactions, processing in parallel by separate agents acting as transaction managers for each interaction, which in turn may distribute work for parallel processing to multiple subordinate agents (e.g., responding to the request of the transaction managers, enacting the same protocol). The agent program or protocol may be based on functional programming concepts. The agent program or protocol may be naturally parallel and order of processing may not be required. As such, the agent program or protocol, in this example, may be schedule free with lazy evaluation.

As distinct from Map-Reduce algorithms, which divide a workload across multiple workers and then aggregate results, in this example, diverse workloads may be distributed to agents and coordinated such that overall processing of a complex event may be modeled in a single language with a unified execution engine with all agents leveraging shared domain semantics and object data store so metadata and state is exchanged efficiently. Agents may run in the same compute node or distributed nodes, which may represent different deployment technologies (e.g., servers, virtual machines, containers) and the placement of agent workloads may itself be an automated, domain-driven, policy-controlled decision based on real-time metadata and state. Task operations may be delegated to federated services as specified. As such, the middle-tier may be flattened and/or unified.

In contrast to big-data, this example is not a simple map-reduce of a workload across workers over nodes. In this example, there may be a "simple request" for an object and one or more agents may decode at least some (or all) complex interdependencies as discrete tasks (i.e., diverse workloads). An executive transaction manager may delegate to many workers (subordinate agents) for parallelism, and an executive agent may reason over inputs and may direct next actions.

Figure 15:
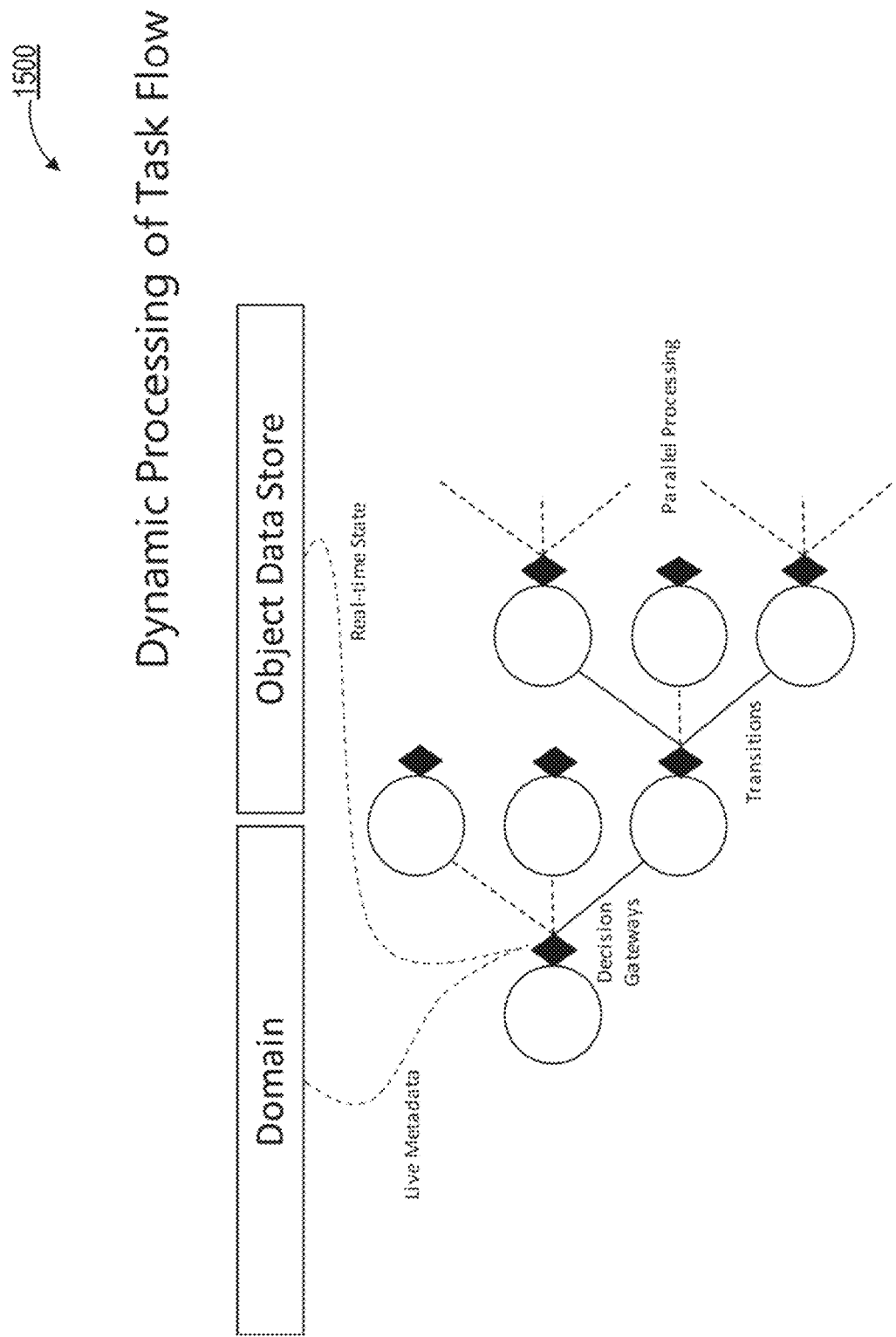
FIGS. 15 and 16 highlight examples of roles of "decision gateways" that may drive flow of tasks as well as performance of a task's operations using live metadata and real-time state.
Figure 16:
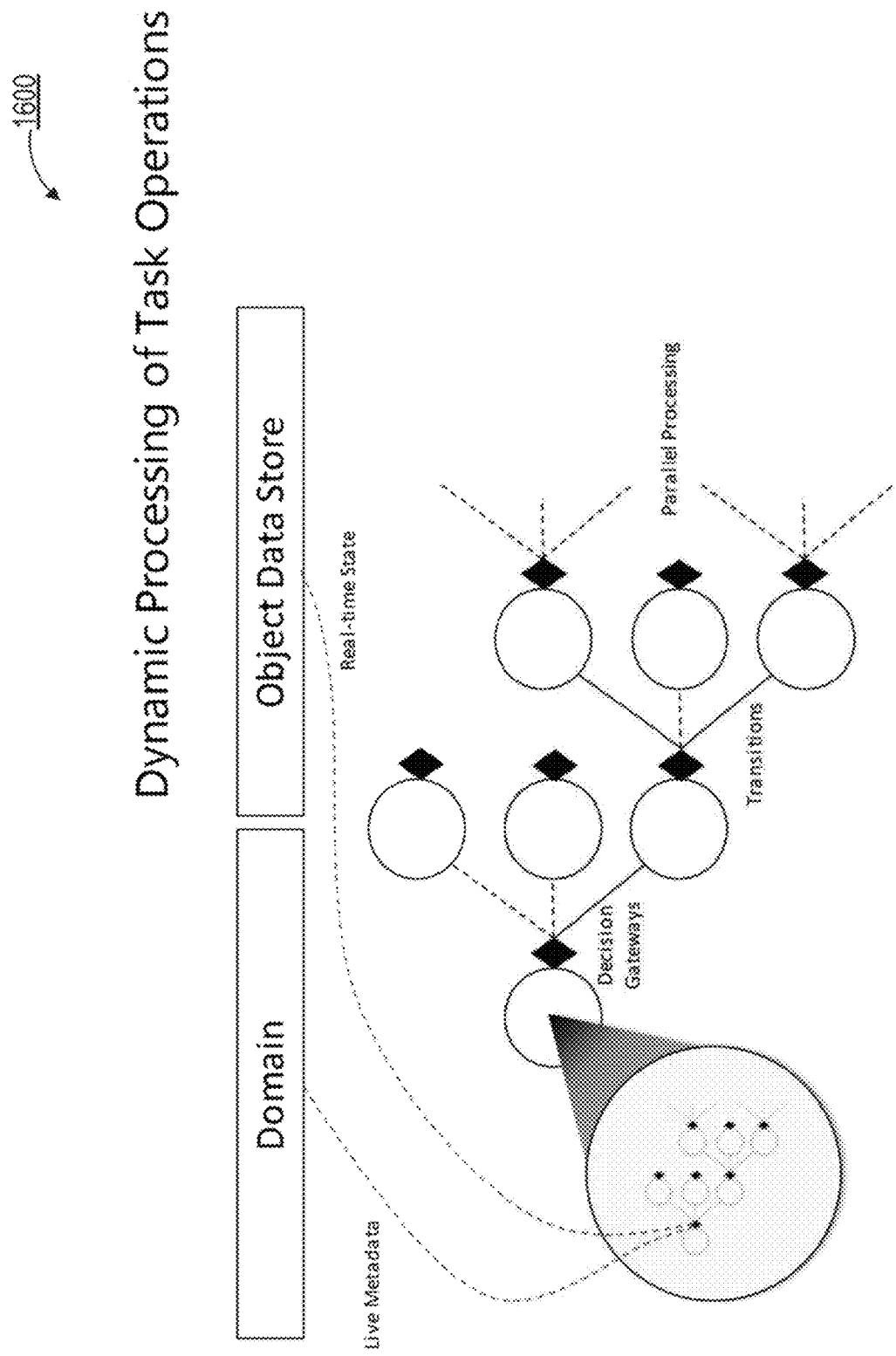

FIGS. 15 and 16 highlight examples 1500 and 1600 of roles of "decision gateways" that may drive flow of tasks as well as performance of a task's operations using live metadata and real-time state. FIGS. 15 and 16 depict automated domain-driven, policy-based decision-making based on live metadata and real-time state.

Complex events may be modeled independent of systems to monitor and respond to behaviors across systems in an after-the-fact approach. It will be appreciated based on content herein that interactions may be modeled against a shared domain, which provides the domain semantics (e.g., domain semantics need not be inferred, they are modeled). Live metadata and real-time state may configure and control the task processing and flows, in a contextualized, model-driven, fact-based manner. In some embodiments, it will be appreciated, based on content herein, that decision gateways may include predictive, probabilistic, fuzzy or the like algorithms, which may weight or rank decisions based on a variety of factors.

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently. The datastore or database may include cloud storage. It will further be appreciated that the term "or," as used herein, may be construed in either an inclusive or exclusive sense. Moreover, plural instances may be provided for resources, operations, or structures described herein as a single instance.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

The invention claimed is:

1. A system that dynamically interprets, configures and controls objects based on a context of one or more interactions, the system comprising:
one or more processors; and
memory storing instructions that, when executed by the one or more processors, cause the system to perform:
determining a context of one or more interactions based on real-time state;
transforming two or more base objects into two or more interpreted objects by interpreting at run-time the two or more base objects based on evaluation of the context, each of the two or more base objects modeled using a same declarative modeling language, the same declarative modeling language enabling transitions between the two or more interpreted objects;
transitioning between at least two of the two or more interpreted objects by chaining the at least two of the two or more interpreted objects based on a post-condition of a particular interpreted object of the at least two of the two or more interpreted objects to create at least a portion of a non-linear process; and
executing the at least the portion of the particular non-linear process.

2. The system of claim 1, wherein the one or more interactions include a real-time system request.

3. The system of claim 1, wherein the post-condition provides hooks for one or more of the two or more interpreted objects to subscribe to interactions associated with the particular interpreted object.

4. The system of claim 1, wherein the at least two of the two or more interpreted objects are chained based on conditional policy-based interactions in a Publish-Subscribe style pattern.

5. The system of claim 1, wherein the at least two of the two or more interpreted objects are chained based on conditional policy-based links in a Hypermedia As The Engine Of Application State style pattern.

6. The system of claim 1, wherein the post-condition is inherited from software contracts of the two or more base objects.

7. The system of claim 6, wherein the software contracts specify non-functional concerns, wrapping at least one of the two or more interpreted objects with centralized policies, thereby enabling common management of heterogeneous objects.

8. The system of claim 7, wherein the centralized policies include security controls, the security controls comprising any of role-based access controls, license keys, certifications and authorizations.

9. The system of claim 7, wherein the centralized policies include system controls, the system controls comprising state management controls.

10. The system of claim 1, wherein at least one of the two or more interpreted objects include at least one pre-condition.

11. The system of claim 10, wherein the at least one pre-condition provides hooks for permissions which support configuration and enforcement of security and identity policies.

12. A method that dynamically interprets, configures and controls objects based on context of one or more interactions, the method being implemented by a computing system including one or more physical processors and storage media storing machine-readable instructions, the method comprising:
determining a context of one or more interactions based on real-time state;
transforming two or more base objects into two or more interpreted objects by interpreting at run-time the two or more base objects based on evaluation of the context, each of the two or more base objects modeled using a same declarative modeling language, the same declarative modeling language enabling transitions between the two or more interpreted objects;
transitioning between at least two of the two or more interpreted objects by chaining the at least two of the two or more interpreted objects based on a post-condition of a particular interpreted object of the at least two of the two or more interpreted objects to create at least a portion of a non-linear process; and
executing the at least the portion of the particular non-linear process.

13. The method of claim 12, wherein the one or more interactions include a real-time system request.

14. The method of claim 12, wherein the post-condition provides hooks for one or more of the two or more interpreted objects to subscribe to interactions associated with the particular interpreted object.

15. The method of claim 12, wherein the at least two of the two or more interpreted objects are chained based on conditional policy-based interactions in a Publish-Subscribe style pattern.

16. The method of claim 12, wherein the at least two of the two or more interpreted objects are chained based on conditional policy-based links in a Hypermedia As The Engine Of Application State style pattern.

17. The method of claim 12, wherein the post-condition is inherited from software contracts of the two or more base objects.

18. The method of claim 17, wherein the software contracts specify non-functional concerns, wrapping at least one of the two or more interpreted objects with centralized policies, thereby enabling common management of heterogeneous objects.

19. The method of claim 18, wherein the centralized policies include security controls, the security controls comprising any of role-based access controls, license keys, certifications and authorizations.

20. The method of claim 18, wherein the centralized policies include system controls, the system controls comprising state management controls.

* * * * *